US012756439B2

(12) United States Patent
Jeon et al.

(10) Patent No.: US 12,756,439 B2
(45) Date of Patent: Oct. 6, 2026

(54) APPARATUS AND METHOD OF UPLINK BEAMFORMING IN WIRELESS LOCAL AREA NETWORK SYSTEM

(71) Applicant: Samsung Electronics Co., Ltd., Suwon-si (KR)

(72) Inventors: Eunsung Jeon, Suwon-si (KR); Chulho Chung, Suwon-si (KR); Jinmin Kim, Suwon-si (KR); Ravi Hiranand Gidvani, Suwon-si (KR); Myeongjin Kim, Suwon-si (KR); Jonghun Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 485 days.

(21) Appl. No.: 18/224,426

(22) Filed: Jul. 20, 2023

(65) Prior Publication Data

US 2024/0030974 A1 Jan. 25, 2024

Related U.S. Application Data

(60) Provisional application No. 63/390,797, filed on Jul. 20, 2022.

(30) Foreign Application Priority Data

Apr. 5, 2023 (KR) ........................ 10-2023-0044789

(51) Int. Cl.

*H04L 12/00* (2006.01)
*H04B 7/0456* (2017.01)

(Continued)

(52) U.S. Cl.

CPC ......... *H04B 7/0617* (2013.01); *H04B 7/0456* (2013.01); *H04L 5/0044* (2013.01); *H04W 84/12* (2013.01)

(58) Field of Classification Search

CPC .. H04B 7/0612; H04B 7/0456; H04B 7/0452; H04B 7/0617; H04L 5/0044; H04L 5/003; H04W 84/12

(Continued)

(56) References Cited

U.S. PATENT DOCUMENTS 10,171,265 B2 1/2019 Chen et al.
10,498,418 B2 * 12/2019 Sanderovich ........ H04B 7/0617

(Continued)

FOREIGN PATENT DOCUMENTS

EP 3319261 A1 * 5/2018 ........... H04L 5/0051
KR 10-2022-0068890 A 5/2022

OTHER PUBLICATIONS

IEEE P802.11be™/D2.0, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT), May 2022, 873 pages.

*Primary Examiner* — Frantz Coby
(74) *Attorney, Agent, or Firm* — Sughrue Mion, PLLC

(57) ABSTRACT

An operating method of a first device communicating with a second device in a wireless local area network (WLAN), includes: receiving, from the second device, a physical layer protocol data unit (PPDU) including a payload that includes a trigger frame; preparing an uplink beamforming matrix based on a value of an uplink beamforming-related first sub-field included in a preamble of the PPDU; beamforming, according to the uplink beamforming matrix, the PPDU; and transmitting the beamformed PPDU to the second device based on a value of an uplink beamforming-related second sub-field included in the trigger frame.

20 Claims, 25 Drawing Sheets

(51) Int. Cl.
*H04B 7/06* (2006.01)
*H04L 5/00* (2006.01)
*H04W 84/12* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 10,869,320 | B2 | 12/2020 | Chun et al. | |
| 11,108,439 | B2 | 8/2021 | Seok et al. | |
| 11,374,797 | B2 | 6/2022 | Doostnejad et al. | |
| 11,784,683 | B2 * | 10/2023 | Seok | H04B 7/0417 370/329 |
| 11,792,846 | B2 * | 10/2023 | Lou | H04W 74/08 370/329 |
| 2016/0100396 | A1 * | 4/2016 | Seok | H04L 5/003 370/329 |
| 2016/0233932 | A1 * | 8/2016 | Hedayat | H04L 5/0048 |
| 2016/0330732 | A1 * | 11/2016 | Moon | H04B 7/0639 |
| 2017/0331534 | A1 * | 11/2017 | Jiang | H04B 7/0617 |
| 2018/0198506 | A1 * | 7/2018 | Sanderovich | H04B 7/06958 |
| 2018/0227027 | A1 * | 8/2018 | Trainin | H04B 7/063 |
| 2021/0211178 | A1 | 7/2021 | Moon et al. | |
| 2021/0314196 | A1 | 10/2021 | Yu et al. | |
| 2021/0409078 | A1 | 12/2021 | Jeon et al. | |
| 2022/0045725 | A1 | 2/2022 | Seok et al. | |
| 2022/0116165 | A1 | 4/2022 | Segev et al. | |
| 2022/0158696 | A1 | 5/2022 | Jeon et al. | |
| 2022/0182881 | A1 | 6/2022 | Suh et al. | |
| 2022/0224381 | A1 | 7/2022 | Yun et al. | |
| 2022/0345904 | A1 * | 10/2022 | Jeon | H04B 7/0617 |
| 2023/0318721 | A1 * | 10/2023 | Lopez | H04B 17/25 370/329 |
| 2023/0319851 | A1 * | 10/2023 | Shilo | H04B 7/0617 370/329 |
| 2024/0275455 | A1 * | 8/2024 | Ly | H04W 16/28 |

* cited by examiner

FIG. 6B

TB1

| Bit | Subfield | Number of bits |
|---|---|---|
| B12 | PE Disambiguity | 1 |
| B13-B16 | Disregard | 4 |
| B17-B19 | Number of Non-OFDMA Users | 3 |

FIG. 13A

TB2

| Trigger Type Subfield Value | Trigger Frame Variant |
|---|---|
| 0 | Basic |
| 1 | Beamforming Report Poll (BFRP) |
| 2 | BR-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8 | New Trigger Variant |
| 9-15 | Reserved |

FIG. 16B

TB3

| Subfield | Definition | Encoding |
|---|---|---|
| UL Beamforming | For an AP, indicates support for the reception of UL beamforming of TB PPDU<br>For a non-AP STA, indicates support for the transmission of UL beamforming of TB PPDU | Set to 0 if not supported.<br>Set to 1 if supported. |

APPARATUS AND METHOD OF UPLINK BEAMFORMING IN WIRELESS LOCAL AREA NETWORK SYSTEM

CROSS-REFERENCE TO RELATED APPLICATION

This application is based on and claims priority to U.S. Provisional Application No. 63/390,797, filed on Jul. 20, 2022, in the U.S. Patent and Trademark Office, and Korean Patent Application No. 10-2023-0044789, filed on Apr. 5, 2023, in the Korean Intellectual Property Office, the disclosures of which are incorporated by reference herein in their entireties.

BACKGROUND

The present disclosure relates to a wireless communication, and in particular, to an apparatus for and method of uplink beamforming in a wireless local area network (WLAN) system.

As an example of wireless communication, a WLAN is a technique for connecting two or more devices by using a wireless signal transfer method. The WLAN technique may comply with the Institute of Electrical and Electronics Engineers (IEEE) 802.11 standard. The 802.11 standard has evolved into 802.11b, 802.11a, 802.11g, 802.11n, 802.11ac, 802.11ax, etc., and may support a transmission speed up to 1 Gbyte/s based on orthogonal frequency-division multiplexing (OFDM) technology.

According to the 802.11ac standard, data may be simultaneously transmitted to a plurality of users using a multi-user multi-input multi-output (MU-MIMO) method. In the 802.11 ax standard, referred to as high efficiency (HE), access to multiple users is implemented by dividing and providing users with available subcarriers by applying an orthogonal frequency-division multiple access (OFDMA) technology as well as MU-MIMO. As such, a WLAN system based on the 802.11ax standard may effectively support communication in a dense area and an outdoor area.

In the 802.11b standard, referred to as extremely high throughput (EHT), support for 6 GHz unlicensed frequency band, utilization of bandwidth of maximum 320 MHz for each channel, introduction of hybrid automatic repeat and request (HARQ), support of maximum 16×16 MIMO, etc. are to be implemented. As such, a next generation WLAN system may effectively support low latency and ultra high-speed transmission such as new radio (NR) that is a 5G technique. However, next generation WLAN systems require a large amount of signaling and a large amount of resources to perform uplink beamforming. Accordingly, there is a need to reduce signaling and resources required to perform uplink beamforming.

SUMMARY

Example embodiments of the present disclosure an apparatus for and method of effectively implementing uplink beamforming in a wireless local area network (WLAN) system.

According to an aspect of an example embodiment, an operating method of a first device communicating with a second device in a wireless local area network (WLAN), includes: receiving, from the second device, a physical layer protocol data unit (PPDU) including a payload that includes a trigger frame; preparing an uplink beamforming matrix based on a value of an uplink beamforming-related first sub-field included in a preamble of the PPDU; beamforming, according to the uplink beamforming matrix, the PPDU; and transmitting the beamformed PPDU to the second device based on a value of an uplink beamforming-related second sub-field included in the trigger frame.

According to an aspect of an example embodiment, an operating method of a first device communicating with a second device in a wireless local area network (WLAN), includes: receiving, from the second device, a null data packet announcement (NDPA) signal and a null data packet (NDP); preparing an uplink beamforming matrix based on the NDP; receiving a trigger frame including an uplink beamforming-related sub-field from the second device; beamforming an uplink signal according to the uplink beamforming matrix based on a value of the sub-field; and transmitting the beamformed uplink signal to the second device.

According to an aspect of an example embodiment, an operating method of a first device communicating with a second device in a wireless local area network (WLAN), includes: receiving, from the second device, an aggregated-media access control (MAC) protocol data unit (A-MPDU) including a first trigger frame corresponding to a first band; preparing an uplink beamforming matrix based on a value of an uplink beamforming-related first sub-field included in a preamble corresponding to the first band of the A-MPDU; beamforming, according to the uplink beamforming matrix, the A-MPDU; and transmitting the beamformed A-MPDU to the second device based on a value of an uplink beamforming-related second sub-field included in the first trigger frame.

According to an aspect of an example embodiment, a modem chip includes: a receiving beamforming circuit including a payload including a trigger frame, wherein the receiving beamforming circuit is configured to prepare an uplink beamforming matrix based on a value of an uplink beamforming-related first sub-field included in a preamble of a physical layer protocol data unit (PPDU) received from a radio frequency integrated circuit (RFIC); and a transmission circuit configured to output to the RFIC the PPDU that is beamformed according to the uplink beamforming matrix based on a value of an uplink beamforming-related second sub-field included in the trigger frame.

BRIEF DESCRIPTION OF THE DRAWINGS

Embodiments of the present disclosure will be more clearly understood from the following detailed description taken in conjunction with the accompanying drawings in which:

FIGS. 6A and 6B are diagrams for describing a first sub-field according to one or more embodiments;

FIG. 13A is a diagram showing encoding of a trigger type sub-field according to one or more embodiments;

FIG. 16B is a diagram for describing uplink beamforming-related capability information;

DETAILED DESCRIPTION

Figure 1:
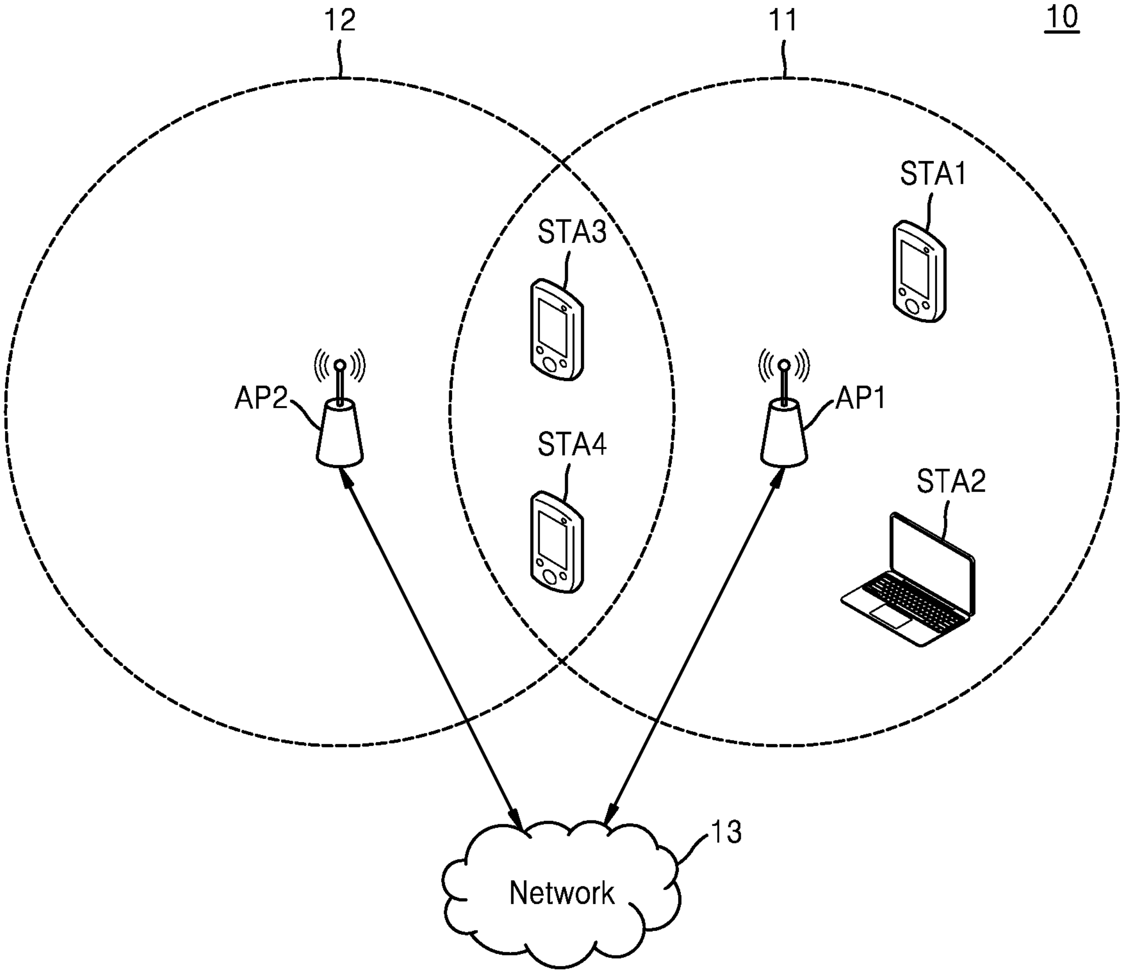
FIG. 1 is a diagram of a wireless communication system according to one or more embodiments.

FIG. 1 is a diagram of a wireless communication system 10 according to one or more embodiments. In detail, FIG. 1 shows a wireless local area network (WLAN) system as an example of the wireless communication system 10.

In this description of the embodiments, Orthogonal Frequency Division Multiplexing (OFDM) or orthogonal frequency division multiplexing access (OFDMA)-based wireless communication systems, especially IEEE 802.11 standard, are discussed exemplarily. However, as will be appreciated by those skilled in the art, the subject matter may be favorably applied to any other communication systems having similar technical background and channel forms (e.g., cellular communication system such as long term evolution (LTE), LTE-advanced (LTE-A), new radio (NR), wireless broadband (WiBro), global system for mobile communication (GSM), or short range communication system such as Bluetooth, near field communication (NFC)).

In addition, various functions described below may be implemented or supported by artificial intelligence technology or one or more computer programs, and each of the programs consists of computer-readable program code and is embodied in a computer-readable medium. The terms “application” and “program” refer to one or more computer programs, software components, sets of instructions, procedures, functions, objects, classes, instances, related data, or portions thereof suitable for implementation of suitable computer-readable program code. The term “computer-readable program code” includes computer code of any type, including source code, object code, and executable code. The term “computer-readable medium” includes any type of medium that may be accessed by a computer, such as read only memory (ROM), random access memory (RAM), a hard disk drive, a compact disk (CD), a digital video disk (DVD), or any other type of memory. A “non-transitory” computer-readable medium excludes wired, wireless, optical, or other communication links that transmit transitory electrical or other signals. Non-transitory computer-readable media includes media in which data may be permanently stored, and media in which data is stored and may be overwritten later, such as a rewritable optical disc or a removable memory apparatus.

In various embodiments described below, a hardware approach is described as an example. However, because various example embodiments include technology using both hardware and software, the various example embodiments do not exclude a software-based approach.

In addition, terms referring to control information, terms referring to entries, terms referring to network entities, terms referring to messages, and terms referring to a component of an apparatus, used in the description to be described below, are examples for convenience of description. Accordingly, the embodiments are not limited to the terms described below, and other terms having equivalent technical meanings may be used.

Referring to FIG. 1, according to one or more embodiments, the wireless communication system 10 may include first and second access points AP1 and AP2, a first station STA1, a second station STA2, a third station STA3, and a fourth station STA4. The first and second access points AP1 and AP2 may be connected to a network 13 including Internet, internet protocol (IP) network, or another arbitrary network. The first access point AP1 may provide the first station STA1, the second station STA2, the third station STA3, and the fourth station STA4 with the connection to the network 13 within a first coverage area 11, and the second access point AP2 may also provide the third and fourth stations STA3 and STA4 with the connection to the network 13 within a second coverage area 12. In some embodiments, the first and second access points AP1 and AP2 may communicate with at least one of the first station STA1, the second station STA2, the third station STA3, and the fourth station STA4 based on wireless fidelity (WiFi) or another WLAN connection technology.

The access point may be referred to as a router, a gateway, etc., and the station may be referred to as a mobile station, a subscriber station, a terminal, a mobile terminal, a wireless terminal, user equipment, a user, etc. The station may be a mobile device such as a mobile phone, a laptop computer, a wearable device, etc., or may be a stationary device such as a desk top computer, a smart TV, etc. In the specification, the station (STA) may be referred to as a first device (or a third device), and the access point (AP) may be referred to as a second device.

The access points AP1 and AP2 may allocate at least one resource unit (RU) to at least one of the stations STA1 to STA4. The access points AP1 and AP2 may transmit data via the allocated at least one RU, and the at least one station may receive the data via the allocated at least one RU. In 802.11ax, the access points AP1 and AP2 may allocate a single RU to at least one station, but in 802.11be (hereinafter, EHT) or next generation IEEE 802.11 standards (hereinafter, EHT+), the access points AP1 and AP2 may allocate a multi-resource unit (MRU) including two or more RUs to at least one station. For example, the first access point AP1 may allocate the MRU to at least one of the first station STA1, the second station STA2, the third station STA3, and the fourth station STA4, and may transmit data via the allocated MRU.

The first and second access points AP1 and AP2 and the first to fourth stations STA1 to STA4 may communicate with one another by using a beamforming method. For example, performing beamforming for a single user may improve reception performance of the single user. Furthermore, multi-user beamforming may improve reception performance of the entire multi-users by removing interferences among the multi-users.

The access points AP1 and AP2 and the stations STA1 to STA4 may perform a channel sounding process for the beamforming, and the channel sounding process may be based on a sounding protocol. The access points AP1 and AP2 may perform the channel sounding process with the stations STA1 to STA4 supporting various protocol standards (e.g., EHT, EHT+, etc.).

The embodiments are to be described based on communication between the first station STA1 and the first access point AP1 for uplink beamforming of the first station STA1, and the embodiments may be applied to the second access point AP2 and the second to fourth stations STA2 to STA4.

In one or more embodiments, in order to reduce complexity and overhead of the signaling between the first station STA1 and the first access point AP1 for the uplink beamforming of the first station STA1, transmission/reception of sounding null data packet (NDP) or a compressed beamforming report (CBR) frame may be omitted. In addition, a comparative example in which the sounding NDP or the CBR frame is transmitted/received will be described later with reference to FIG. 3.

In one or more embodiments, the first station STA1 may receive a physical layer protocol data unit (PPDU) including a trigger frame from the first access point AP1. In response to receiving the PPDU, the first station STA1 prepares an uplink beamforming matrix based on the PPDU, beamforms the PPDU according to the beamforming matrix, and may transmit the beamformed PPDU to the first access point AP1. In some embodiments, the PPDU may correspond to a media access control (MAC) packet data unit (MPDU). Detailed embodiments regarding this will be described below with reference to FIGS. 4, 5, etc.

In one or more embodiments, the first station STA1 may sequentially receive a null data packet announcement (NDPA) signal, the NDP, and the trigger frame from the first access point AP1, prepare the uplink beamforming matrix based on the NDP, beamform the PPDU according to the uplink beamforming matrix based on the trigger frame, and transmit the beamformed PPDU to the first access point AP1. Detailed embodiments regarding this will be described below with reference to FIGS. 9, 10A, 10B, etc.

In one or more embodiments, the first station STA1 may receive an aggregated-MAC packet data unit (A-MPDU) including the trigger frame corresponding to the bandwidth aligned to the first station STA1 from the first access point AP1, prepare uplink beamforming matrix based on the A-MPDU, beamforms the A-MPDU according to the uplink beamforming matrix, and transmit the beamformed PPDU to the first access point AP1. Detailed embodiments regarding this will be described below with reference to FIGS. 14, 15, etc.

The first access point AP1 and the first station STA1 according to one or more embodiments may communicate with each other with minimum signaling in order to perform the uplink beamforming, and may effectively reduce the resource that is required to perform the uplink beamforming by utilizing the sent/received signals. As a result, the resource used for the data communication between the first access point AP1 and the first station STA1 may be increased, and then entire data throughput may be increased.

Figure 2:
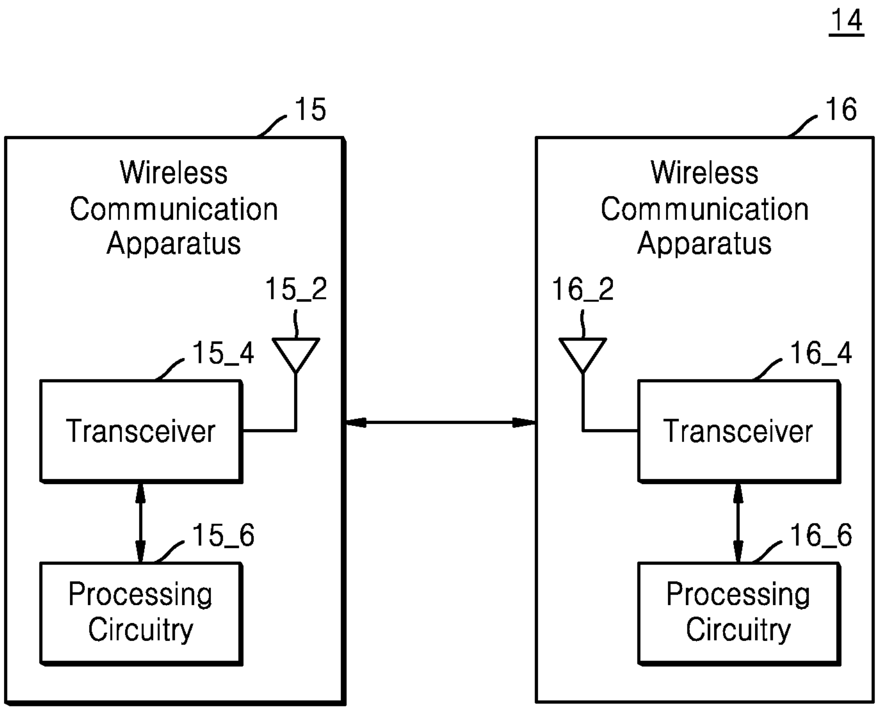
FIG. 2 is a block diagram of a wireless communication system according to one or more embodiments.

FIG. 2 is a block diagram of a wireless communication system 14 according to one or more embodiments. In detail, the block diagram of FIG. 2 represents a first wireless communication device 15 and a second wireless communication device 16 communicating with each other in the wireless communication system 14. Each of the first wireless communication device 15 and the second wireless communication device 16 of FIG. 2 may be an arbitrary device communicating in the wireless communication system 14, and may be referred to as a device for wireless communication. In some embodiments, the first wireless communication device 15 and the second wireless communication device 16 may each be an access point or a station in the WLAN system. For example, the first wireless communication device 15 may be access point AP1, and the second wireless communication device 16 may be access point AP2.

Referring to FIG. 2, the first wireless communication device 15 may include an antenna 15_2, a transceiver 15_4, and a processing circuitry 15_6. In some embodiments, the antenna 15_2, the transceiver 15_4, and the processing circuitry 15_6 may be included in one package, or may be respectively included in different packages. The second wireless communication device 16 may also include an antenna 16_2, a transceiver 16_4, and a processing circuitry 16_6. Hereinafter, redundant descriptions about the first wireless communication device 15 and the second wireless communication device 16 are omitted.

The antenna 15_2 may receive a signal from the second wireless communication device 16 and provide the signal to the transceiver 15_4, or may transmit a signal provided from the transceiver 15_4 to the second wireless communication device 16. In some embodiments, the antenna 15_2 may include a plurality of antennas for multiple-input multiple-output (MIMO). In some embodiments, the antenna 15_2 may include a phased array for beamforming.

The transceiver 15_4 may process the signal received from the second wireless communication device 16 via the antenna 15_2, and may provide processed signal to the processing circuitry 15_6. In one or more examples, the transceiver 15_4 may process the signal provided from the processing circuitry 15_6, and may output the processed signal via the antenna 15_2. In some embodiments, the transceiver 15_4 may include an analog signal such as a low-noise amplifier, a mixer, a filter, a power amplifier, an oscillator, etc. In some embodiments, the transceiver 154 may process the signal received from the antenna 15_2 and/or the signal received from the processing circuitry 15_6 based on the control from the processing circuitry 15_6.

The processing circuitry 15_6 may process the signal received from the transceiver 15_4 so as to extract information transmitted from the second wireless communication device 16. For example, the processing circuitry 15_6 may extract the information by demodulating and/or decoding the signal received from the transceiver 15_4. In one or more examples, the processing circuitry 15_6 may generate a signal including information to be transmitted to the second wireless communication device 16 and provide the signal to the transceiver 15_4. For example, the processing circuitry 15_6 may provide the transceiver 15_4 with a signal that is generated by encoding and/or modulating data to be transmitted to the second wireless communication device 16. In some embodiments, the processing circuitry 15_6 may include a programmable element such as a central processing unit (CPU), a digital signal processor (DSP), etc., a reconfigurable element such as a field programmable gate array (FPGA), or an element providing fixed function such as an intellectual property (IP) core, etc. In some embodiments, the processing circuitry 15_6 may include a memory storing data and/or a series of instructions, or may access the memory.

In the specification, the transceiver 15_4 and/or the processing circuitry 15_6 performing operations may be simply referred to as the first wireless communication device 15 performing the corresponding operations. Accordingly, the operations performed by the access point may be performed by the transceiver and/or the processing circuitry included in the access point, and the operations performed by the station may be performed by the transceiver and/or the processing circuitry included in the station.

Figure 3:
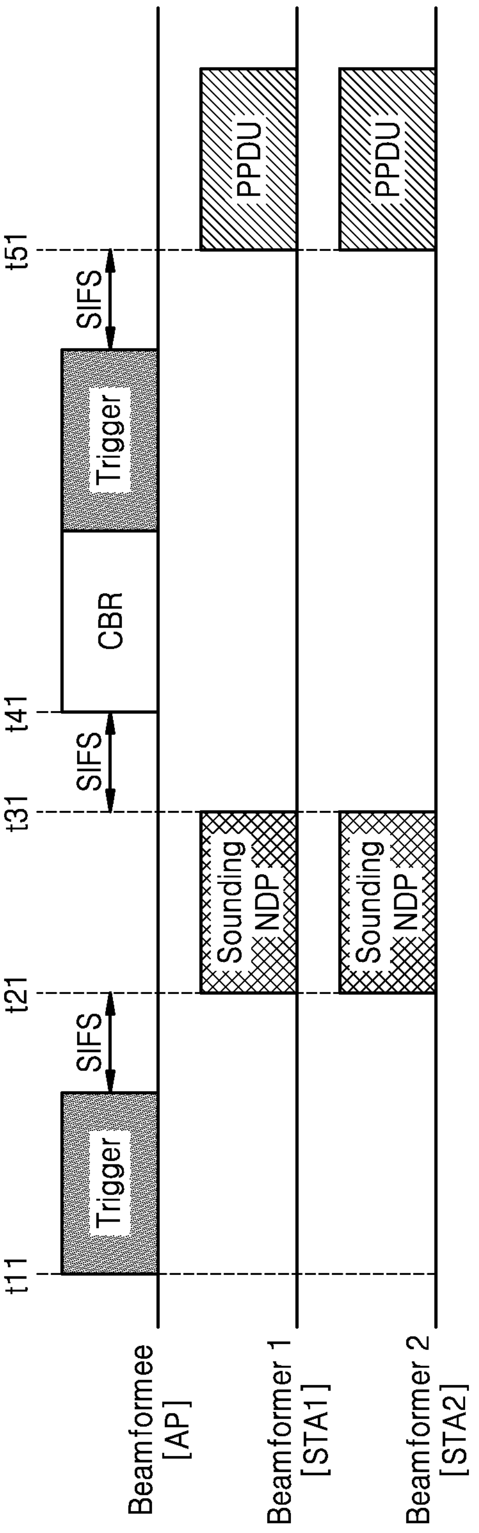
FIG. 3 is a timing diagram showing signaling for uplink beamforming according to a comparative example according to one or more embodiments.

FIG. 3 is a timing diagram showing a signaling for uplink beamforming according to one or more embodiments. In detail, the timing diagram of FIG. 3 includes a channel sounding process performed by the beamformee and first and second beamformers, for the uplink beamforming. In FIG. 3, the beamformee may be an access point, and the first and second beamformers may be the first and second stations, respectively.

Referring to FIG. 3, at a time t11, the beamformee may transmit a trigger frame to the first and second beamformers. In detail, the beamformee may transmit the trigger frame that requests a sounding NDP for obtaining uplink channel status information to the first and second beamformers. In one or more examples, the request for the sounding NDP may be included in a field of the trigger frame.

At time t21, the first and second beamformers may each transmit the sounding NDP to the beamformee. In detail, each of the first and second beamformers may transmit the sounding NDP to the beamformee when a short interframe space (SIFS) time has passed after receiving the trigger frame. The beamformee may estimate the uplink channel based on the sounding NDP received from the first and second beamformers, and may generate information about the uplink channel status.

At time t41, the beamformee may transmit a compressed beamforming report (CBR) frame and the trigger frame to the first and second beamformers. In detail, the beamformee may transmit the CBR frame and the trigger frame to the first and second beamformers after SIFS time has passed from the point in time of receiving the sounding NDP. In some embodiments, the CBR frame may be referred to as a feedback frame, and the CBR frame may include uplink channel status information generated by the beamformee.

At time t51, each of the first and second beamformers may transmit beamformed PPDU to the beamformee. In detail, each of the first and second beamformers may transmit the beamformed PPDU to the beamformee after the SIFS time has passed from the point in time of receiving the trigger frame. Each of the first and second beamformers may determine the uplink beamforming matrix based on the uplink channel status information included in the CBR frame, and may generate the beamformed PPDU based on the determined uplink beamforming matrix.

In one or more examples, signaling between the time t11 and time t31 may be performed in order for each of the first and second beamformers to transmit the beamformed PPDU to the beamformee, and the signaling may increase the overhead in the wireless communication system as the number of beamformers communicating with the beamformee increases, thereby decreasing the total data throughput.

The embodiments that will be described below are provided to perform effective communication according to the uplink beamforming through a minimum signaling, for example, signaling between the time t11 and the time t31 is omitted.

Figure 4:
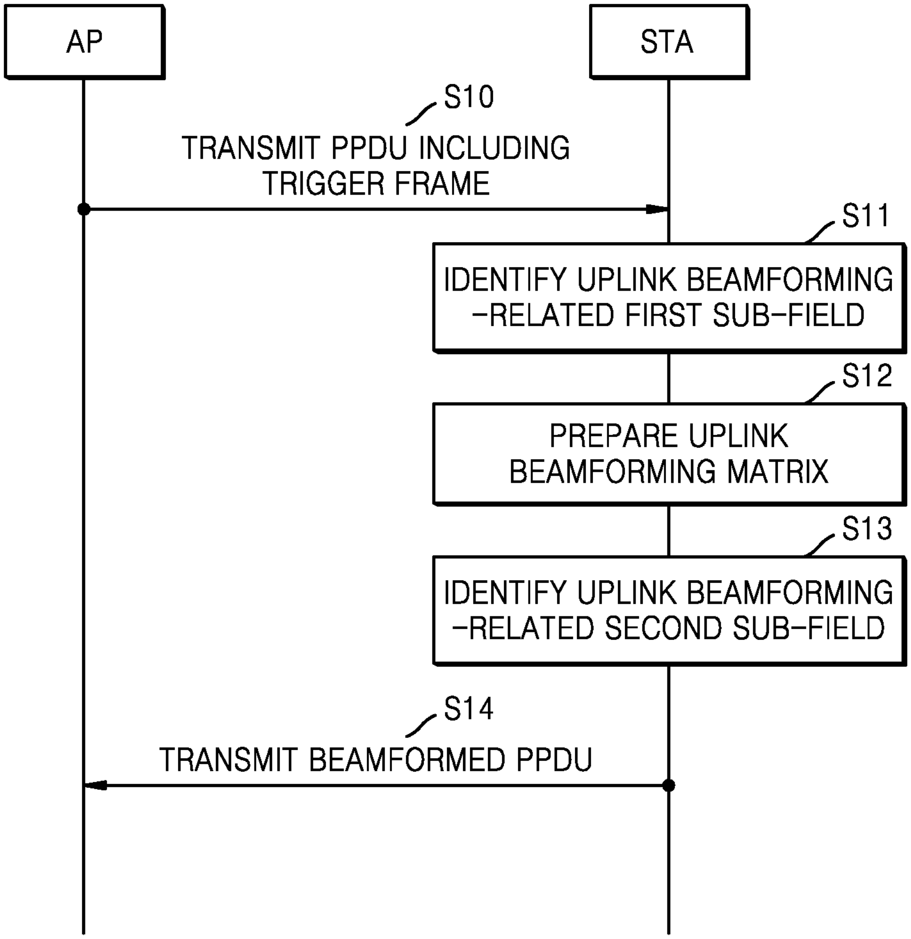
FIG. 4 is a flowchart illustrating a method for uplink beamforming according to one or more embodiments.

FIG. 4 is a flowchart illustrating a method of uplink beamforming according to one or more embodiments. In detail, the flowchart of FIG. 4 shows operations of the access point AP, that is, the beamformee, and the stations STA, that is, the beamformers, in the uplink beamforming.

Referring to FIG. 4, in operation S10, the access point AP may transmit the PPDU including the trigger frame to the station STA. The station STA may be any one of the first to fourth stations (STA1-STA4) in FIG. 1, and the access point AP may be any one of the first AP1 and the second AP2 in FIG. 1. In one or more embodiments, the trigger frame may be included in a payload of the PPDU.

In operation S11, the station STA may identify a first sub-field related to the uplink beamforming. In one or more embodiments, the station STA may identify a value of the first sub-field included in a preamble of the received PPDU. The first sub-field may be a sub-field that is defined to indicate whether the station STA has to prepare the uplink beamforming matrix. In one or more embodiments, the first sub-field may be commonly used in another station communicating with the access point AP.

In operation S12, the station STA may prepare the uplink beamforming matrix. In one or more embodiments, the station STA may estimate a downlink channel based on the trigger frame when the first sub-field has a value indicating that the station STA has to prepare the uplink beamforming matrix, and may prepare the uplink beamforming matrix by determining the uplink beamforming matrix based on the estimated downlink channel. In detail, the station STA may prepare the uplink beamforming matrix by equalizing the downlink channel estimated based on a channel reciprocity with the uplink channel.

In operation S13, the station STA may identify a second sub-field related to the uplink beamforming. In one or more embodiments, the station STA may identify the second sub-field related to the uplink beamforming, included in the trigger frame. In one or more embodiments, the station STA may identify a value of the second sub-field included in the trigger frame. The second sub-field may be a sub-field that is defined to indicate whether the access point AP requests the uplink beamforming (or beamformed PPDU) from the station STA. In one or more embodiments, the second sub-field may be independently used in a certain station STA, and the second sub-field may be implemented as shown in FIG. 8C or 8D that will be described later. In some embodiments, the second sub-field may be commonly used in a plurality of stations including the station STA, and the second sub-field may be implemented as shown in FIG. 8B that will be described later. In one or more examples, the determination of any particular subfield value in a frame or packet may be performed by any designed circuitry or software that is configured to parse the frame or packet to extract information to determine the value.

In operation S14, the station STA may transmit the beamformed PPDU to the access point AP. In one or more embodiments, the station STA may generate the beamformed PPDU based on the uplink beamforming matrix prepared in operation S12, when the second sub-field has a value indicating that the uplink beamforming has been requested.

Figure 5:
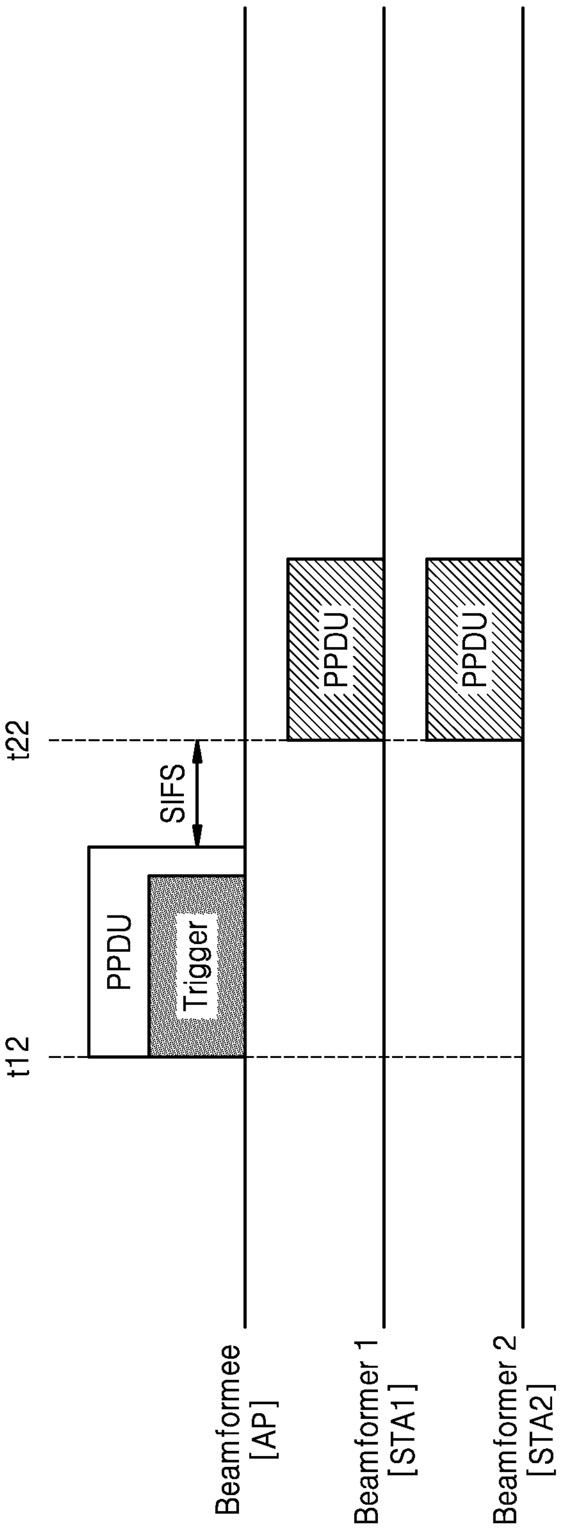
FIG. 5 is a timing diagram showing signaling for uplink beamforming according to one or more embodiments.

FIG. 5 is a timing diagram showing a signaling for uplink beamforming according to one or more embodiments. In detail, the timing diagram of FIG. 5 includes a channel sounding process performed by the beamformee and first and second beamformers, for the uplink beamforming. In FIG. 5, the beamformee is an access point AP, and the first and second beamformers are first and second stations STA1 and STA2.

Referring to FIG. 5, at aa time t12, the beamformee may transmit the PPDU including the trigger frame to the first and second beamformers. In detail, the beamformee may arrange the trigger frame in one or more fields of the payload in the PPDU and then transmit the PPDU to the first and second beamformers. The beamformee may commonly notify the first and second beamformers whether the uplink beamforming matrix has to be prepared in advance, by using the first sub-field included in the preamble of the PPDU. In one or more examples, the beamformee may individually notify the first and second beamformers whether the uplink beamforming is requested, by using the second sub-fields included in the trigger frame.

At time t22, the first and second beamformers estimate a downlink channel by decoding the trigger frame, and then may determine the uplink beamforming matrix based on the estimated downlink channel, when it is identified that the uplink beamforming matrix has to be prepared based on the first sub-field of the PPDU. The first beamformer may generate the beamformed PPDU based on the prepared uplink beamforming matrix and transmit the beamformed PPDU to the beamformee, when it is identified that the uplink beamforming is requested based on the second sub-field corresponding to the first beamformer. The second beamformer may generate the PPDU that is not beamformed and transmit the PPDU to the beamformee, when it is identified that the uplink beamforming is not requested based on the second sub-field corresponding to the second beamformer. In some embodiments, the first and second beamformers may transmit the beamformed PPDU to the beamformee or transmit the PPDU that is not beamformed to the beamformee, according to the value of the second sub-field that is in common in the first and second beamformers.

As understood by one of ordinary skill in the art, the embodiment of FIG. 5 is an example, and thus, the embodiments of the present disclosure are not limited thereto. For example, the beamformee may perform the signaling for the uplink beamforming along with one or more beamformers, and the embodiments may be also applied thereto.

Figure 6A:
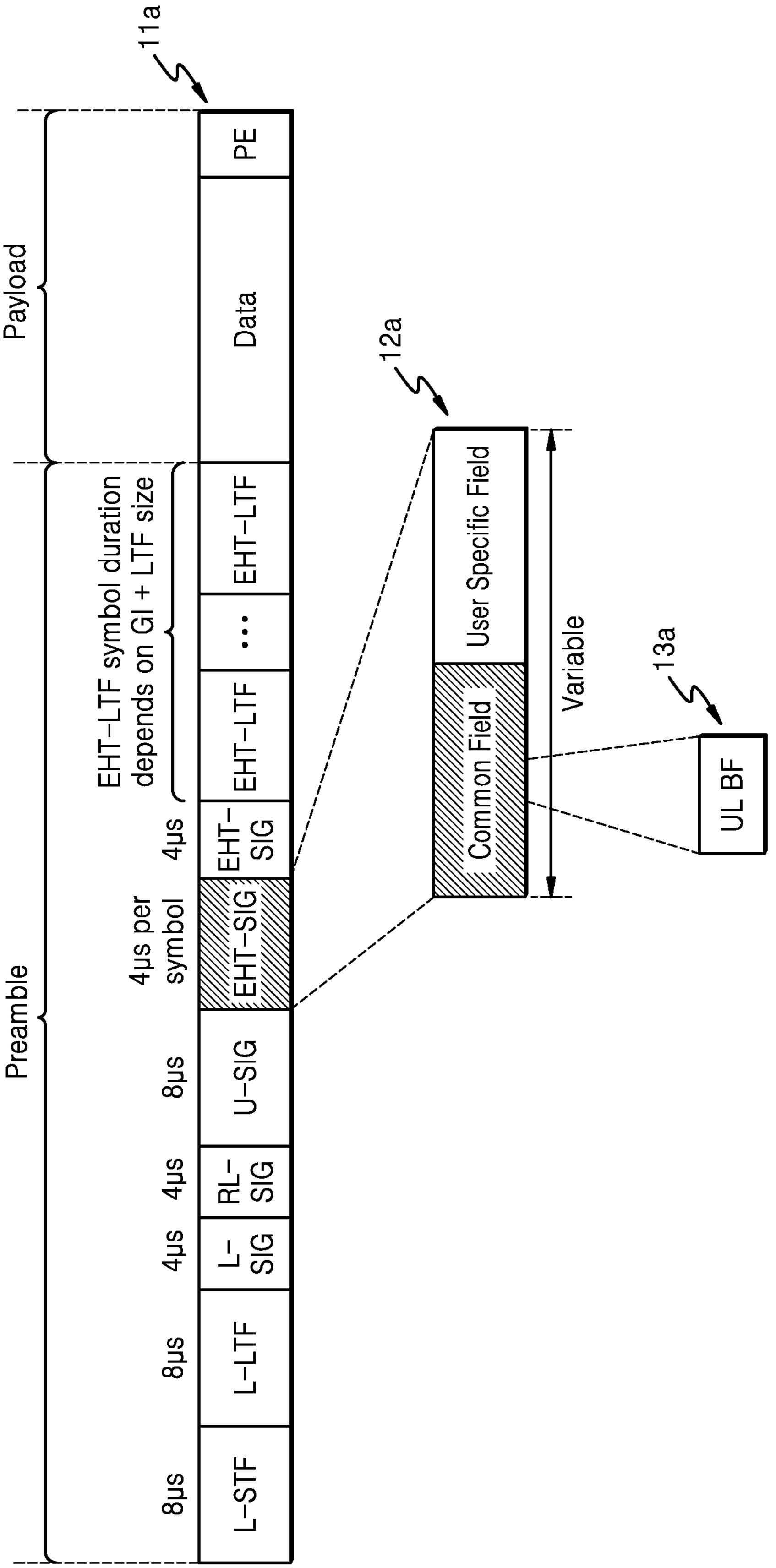

FIGS. 6A and 6B are diagrams for describing a first sub-field according to one or more embodiments. In detail, FIG. 6A shows a structure of an EHT PPDU, and table TB1 in FIG. 6B shows one or more bits in a common field in an EHT-SIG field. In addition, the embodiments will be described based on the standard regarding EHT. However, as understood by one of ordinary skill in the art, the embodiments may be applied to a next generation standard related to ultra high reliability (UHR), and the EHT PPDU may be referred to as UHR PPDU.

Referring to FIG. 6A, the EHT PPDU 11*a* may include a preamble in which training fields and signal fields are included and a payload in which a data field and a packet extension (PE) field are included. The EHT PPDU may include a legacy-short training field (L-STF), a legacy-long training field (L-LTF), a legacy-signal (L-SIG) field, a repeated legacy-signal (RL-SIG) field, a universal signal (U-SIG) field, an extremely high throughput-signal (EHT-SIG) field, an extremely high throughput-short training field (EHT-STF), and an extremely high throughput-long training field (EHT-LTF). In the specification, the U-SIG field and the EHT-SIG field may be simply referred to as U-SIG and EHT-SIG, respectively. In one or more examples, as described above, in the next-generation standard related to UHR, the EHT-SIG field may be referred to as UHR-SIG field.

The L-STF field may include a short training OFDM symbol, and may be used for frame detection, automatic gain control (AGC), diversity detection, and coarse frequency/time synchronization. The L-LTF may include a long training OFDM symbol, and may be used for fine frequency/time synchronization and channel estimation. The L-SIG field may be used to transmit control information, and may include information about data rate and data length. In some embodiments, the fields from the RL-SIG field to the L-SIG field may be repeated.

The U-SIG field may include control information that is common for at least one station receiving the EHT PPDU 11*a*. The EHT-SIG field may have a variable modulation and coding scheme (MCS) and length. For example, when the EHT PPDU 11*a* may be transmitted to multi-users, an EHT-SIG field 12*a* may include a common field including common control information and a user-specified field including control information subjective to a user, as shown in FIG. 6A. As shown in FIG. 6A, the EHT-SIG field 12*a* may have a variable length. The common field may include U-SIG overflow, the total number of non-OFDMA users, RU allocation sub-field (RUA), and a first sub-field (UL-BF) 13*a* regarding the uplink beamforming. The user-specified field for non-MU MIMO may include a STA-ID sub-field, an MCS sub-field, a $N_{STS}$ sub-field, Beamformed sub-field, and a coding sub-field. In one or more examples, a user-specified field for MU-MIMO may include a STA-ID sub-field, an MCS sub-field, a coding sub-field, and a spatial configuration sub-field. In some embodiments, the EHT-SIG field 12*a* may be modulated based on one of two or more modulation methods, e.g., BPSK, quadrature binary phase shift keying (QBPSK), etc.

In addition, the trigger frame may be disposed in the data field Data of the payload.

Referring further to FIG. 6B, as shown in table TBT, a B12 bit in the common field may be set as 'PE Disambiguity sub-field, B13-B16 bits are set as 'Disregard' sub-fields, and B17-B19 bits may be set as 'Number Of Non-OFDMA Users' sub-fields. The first sub-field (UL BF) 13*a* according to the embodiments may be defined by using at least one of the bits in the 'Disregard' sub-field. However, the embodiments are not limited to these configurations, and the first sub-field (UL-BF) 13*a* may be defined by using at least one of another Reserved sub-field.

Figure 7:
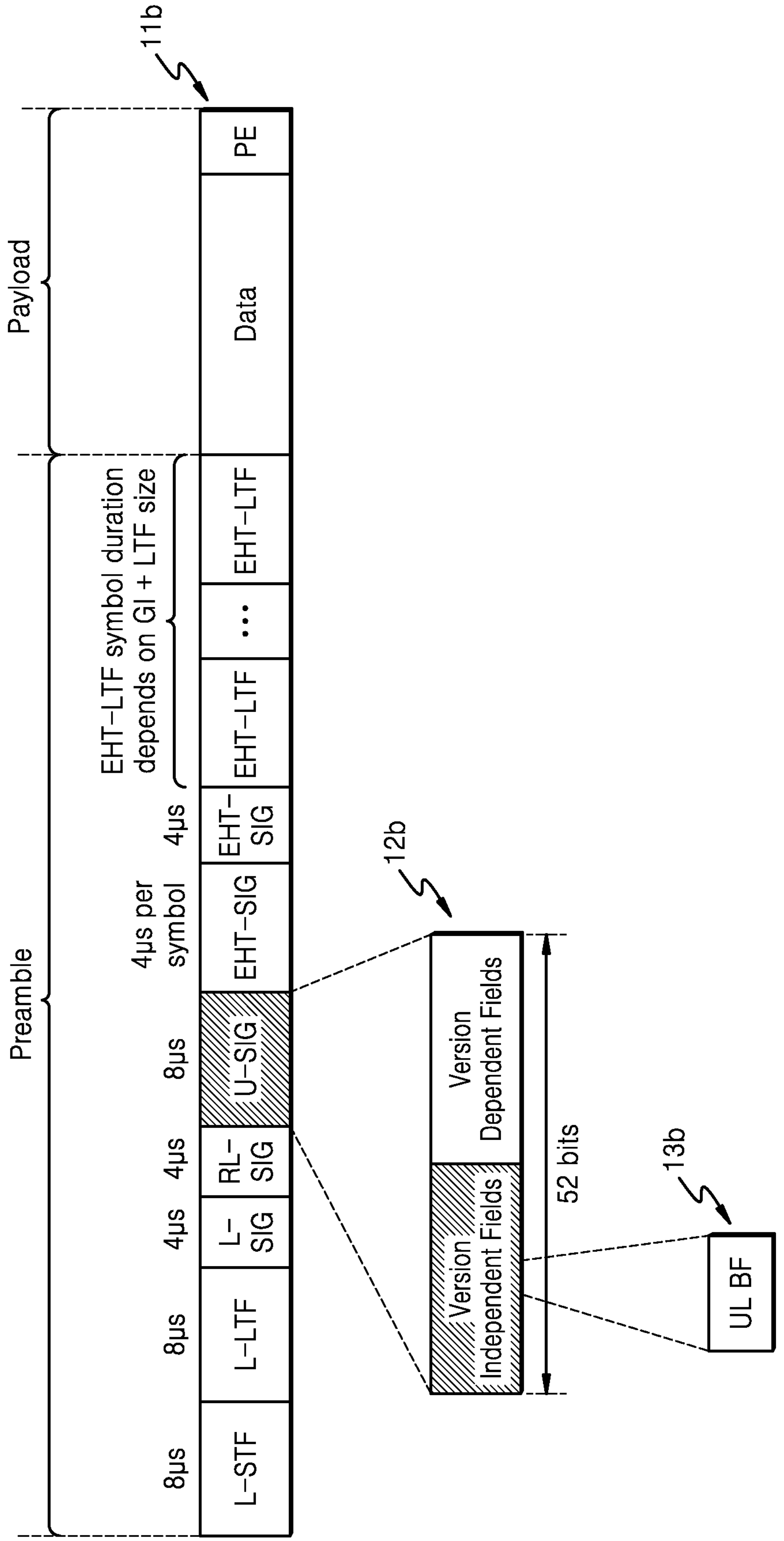
FIG. 7 is a diagram for describing a first sub-field according to one or more embodiments.

FIG. 7 is a diagram for describing a first sub-field according to one or more embodiments. Differences of FIG. 7 from the embodiment of FIG. 6 are described, and redundant descriptions are omitted.

Referring to FIG. 7, a U-SIG field 12*b* of an EHT PPDU 11*b* may include first sub-field (UF BF) 13*b*. The U-SIG field 12*b* may include control information that is common for at least one station receiving the EHT PPDU. For example, as shown in FIG. 7, the U-SIG field 12*b* may include fields independent from a version of a particular communication protocol, and fields dependent on the version. In some embodiments, the U-SIG field 12*b* may further include fields corresponding respectively to a cyclic redundancy check (CRC) and a tail, and Reserved bits. The fields independent from the version may have static positions and bit definition in different generations and/or physical versions. In some embodiments, the fields independent from the version may be arranged in the first sub-field UL BF 13*b*.

Figure 8A:
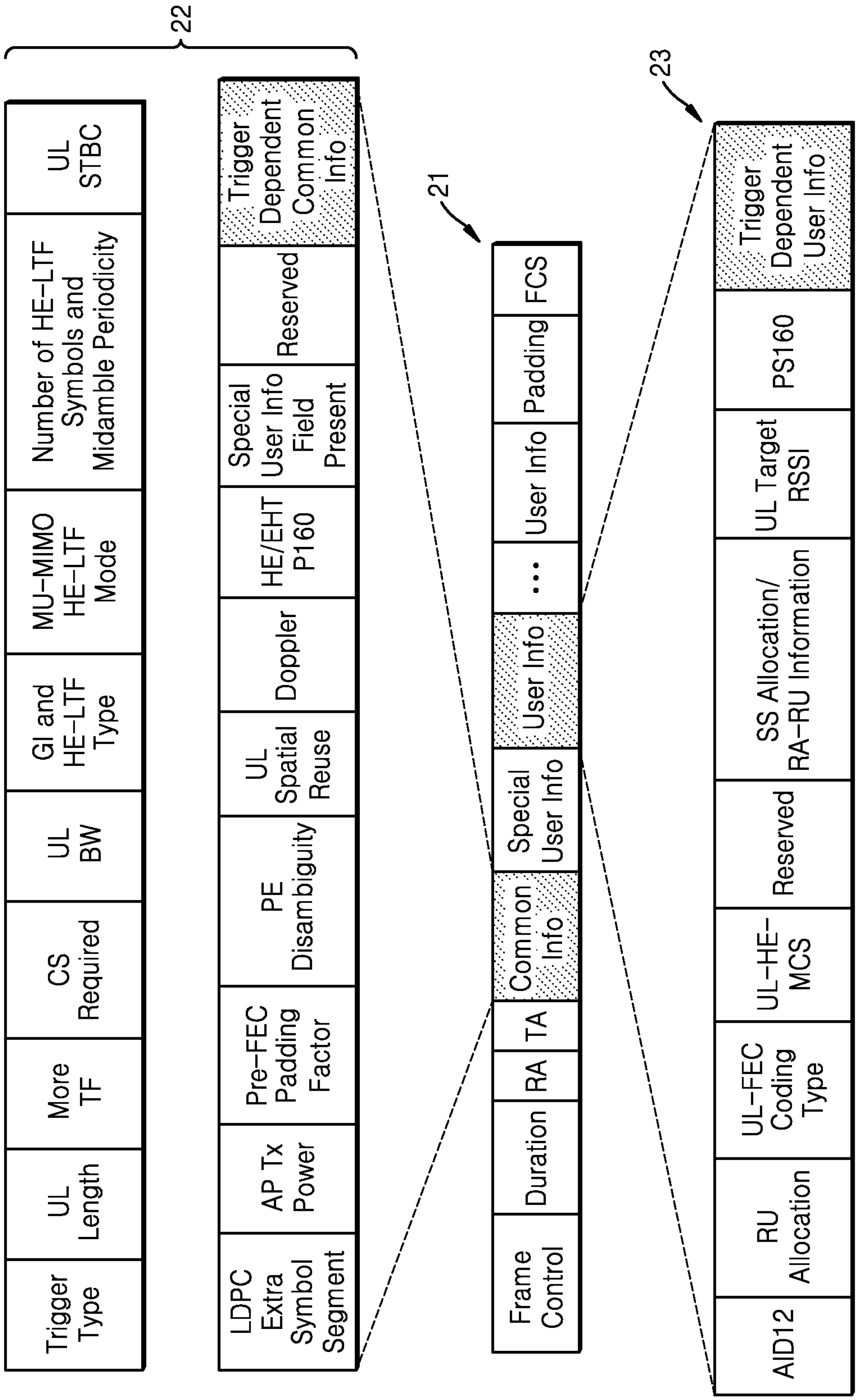
FIGS. 8A to 8D are diagrams for describing a second sub-field according to one or more embodiments.
Figure 8B:
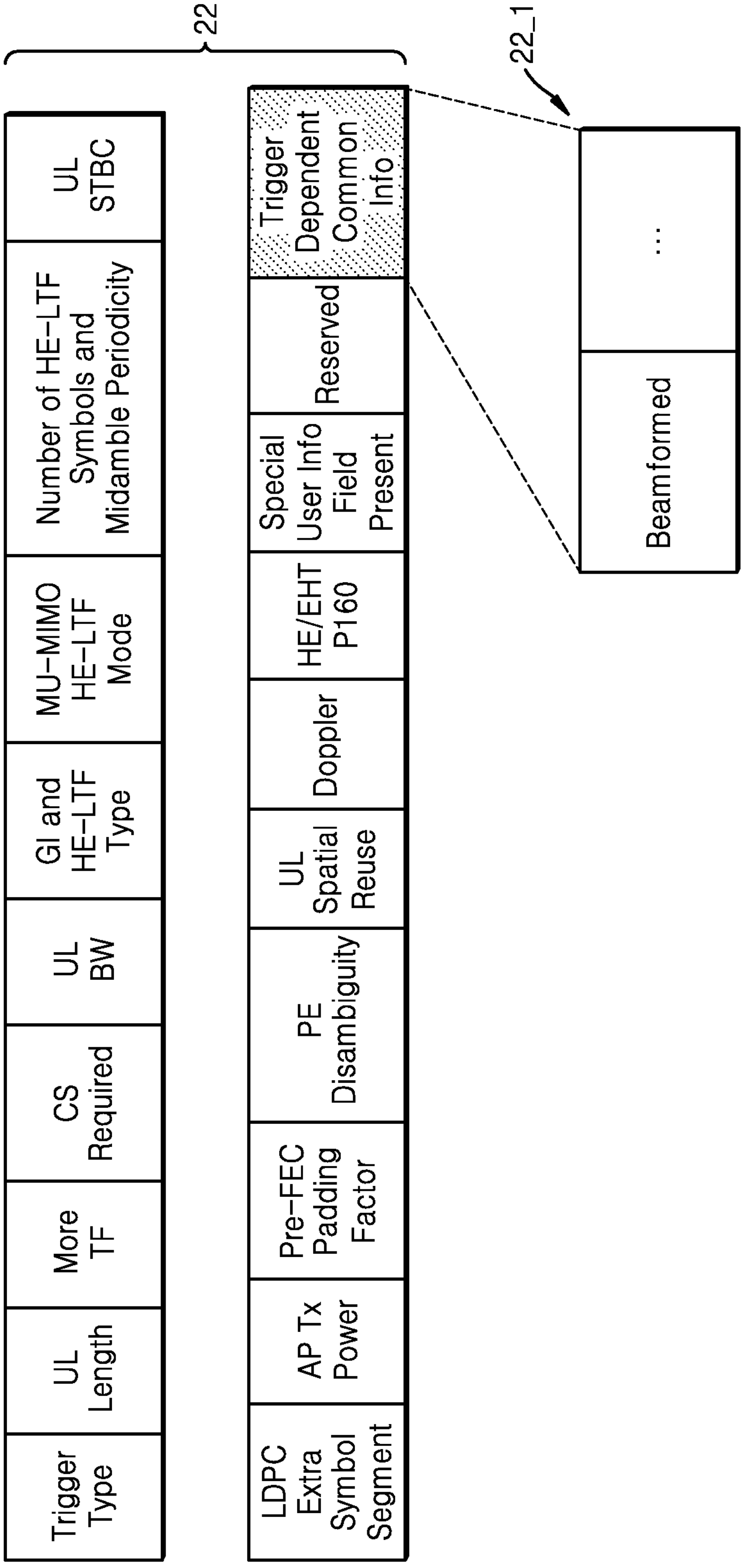
Figure 8C:
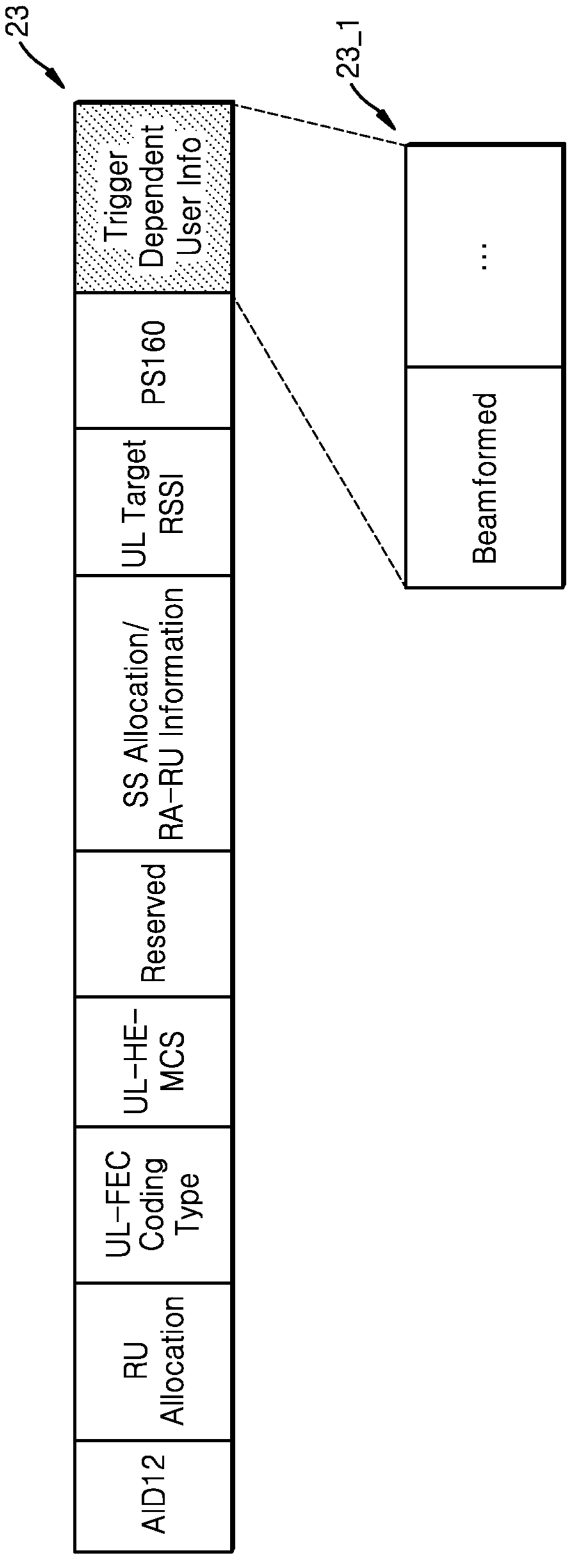
Figure 8D:
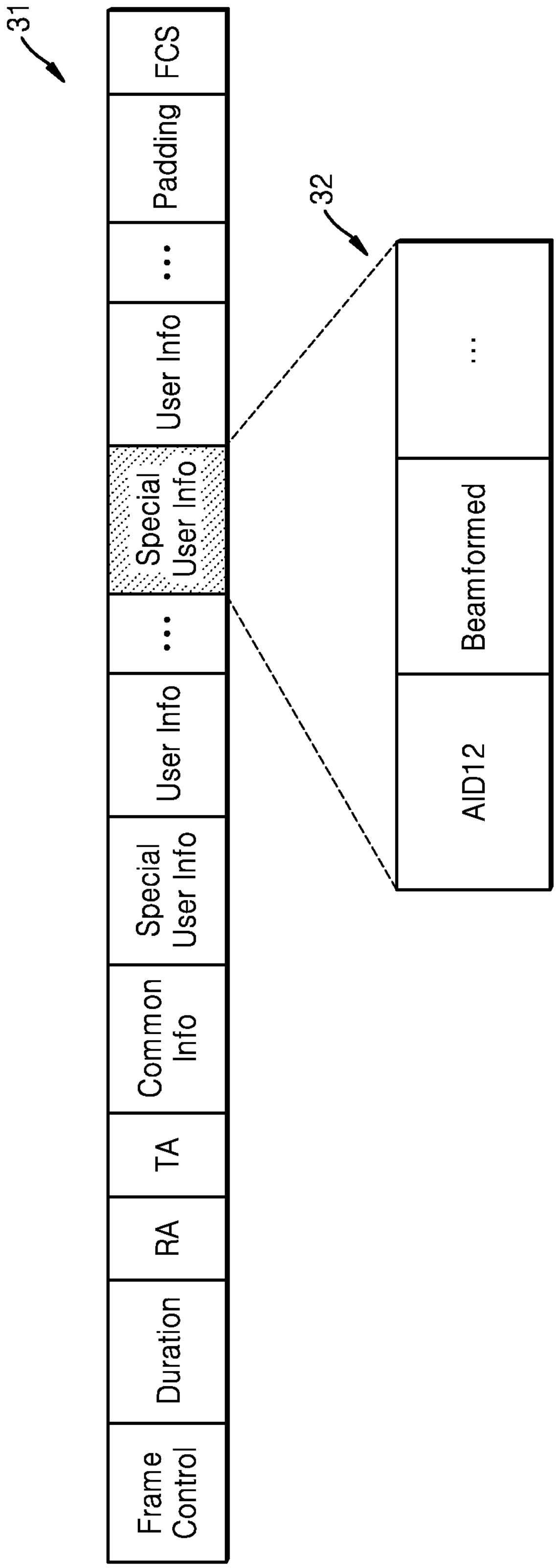

FIGS. 8A to 8D are diagrams for describing a second sub-field according to one or more embodiments. In detail, FIG. 8A shows a trigger frame 21, FIG. 8B shows a common information field 22 included in the trigger frame 21 of FIG. 8A, FIG. 8C shows a user information field 23 included in the trigger frame 21 of FIG. 8A, and FIG. 8D shows a specified user information field 32 included in a trigger frame 31. Hereinafter, the second sub-field may be referred to as a 'beamformed' sub-field. In addition, the embodiments shown in FIGS. 8B to 8D may correspond to independent embodiments in which the second sub-field may be variously arranged.

The trigger frames 21 and 31 may be used for transmitting a trigger-based (TB) PPDU. For example, the access point (or beamformee) may set an uplink bandwidth through the trigger frames 21 and 31, and may allocate a resource unit (RU) for uplink multi-user (MU) transmission. In some embodiments, the trigger frame may include a media access control (MAC) frame, and may be included in the PPDU (e.g., data field of PPDU). In some embodiments, the trigger frame may be included in the PPDU exclusive for the corresponding trigger frame.

Referring to FIG. 8A, the trigger frame 21 may include a frame control field, a duration field, an RA field, a TA field, a common information field, a special user information field, at least one user information field, a padding field, and a frame check sequence (FCS) field. The frame control field may include information about the version of MAC protocol and other additional control information. The duration field may include time information for setting network allocation vector (NAV) or information about a terminal identifier (e.g., association identifier (AID)). The RA field may include address information of a receiving device (e.g., station) of the trigger frame, and may be omitted. The TA field may include address information of a transmission device (e.g., access point) of the trigger frame. The common information field 22 may include control information commonly applied to the receiving devices that receive the trigger frame. The special user information field may be ignored in a legacy protocol standard, and may be omitted from the trigger frame 21. In some embodiments, the special user information field may be used in a sounding protocol for the uplink beamforming. The at least one user information field 23 may correspond to at least one receiving device receiving the trigger frame 21. The common information field 23 and the user information field 23 may each include a plurality of sub-fields as shown in FIG. 8A, and in some embodiments, may include a plurality of sub-fields defined by the EHT.

According to one or more embodiments, from among the plurality of sub-fields included in the common information field 22, the trigger-type sub-field may indicate a type of the trigger frame, and the receiving device may identify trigger frame variant based on the trigger-type sub-field. The trigger frame 21 may include a trigger dependent sub-field according to the trigger frame variant defined by the trigger type sub-field. According to the trigger frame variant, as shown in FIG. 8A, a trigger dependent common information sub-field may be included in the common information field 22, or the trigger dependent common information sub-field may be omitted. In one or more examples, according to the trigger frame variant, as shown in FIG. 8A, a trigger dependent user information sub-field may be included in the user information field 23 or may be omitted.

Referring to FIG. 8B, the trigger frame 21 may include a common information field 22 including a trigger dependent common information sub-field 22_1. In one or more embodiments, the trigger dependent common information sub-field 22_1 may include the 'beamformed' sub-field (or uplink beamforming-related second sub-field). For example, in order to request the uplink beamforming from at least one station receiving the trigger frame 21, the trigger dependent common information sub-field 22_1 may include the 'beamformed' sub-field having a value of 1 or any other suitable value indicating the request for uplink beamforming. For example, when the uplink beamforming is not requested to at least one station receiving the trigger frame 21, the trigger dependent common information sub-field 221 may include the 'beamformed' sub-field having a value of 0. In some embodiments, the trigger dependent common information sub-field 22_1 may further include at least one sub-field of another purpose.

Referring to FIG. 8C, the trigger frame 21 may include a user information field 23 including a trigger dependent user information sub-field 23_1. In one or more embodiments, the trigger dependent user information sub-field 23_1 may include 'beamformed' sub-field (or uplink beamforming-related second sub-field). For example, in order to request the uplink beamforming from a station corresponding to the user information field 23 (e.g., the station corresponding to a value of the 'AID12' sub-field), the trigger dependent user information sub-field 23_1 may include the 'beamformed' sub-field having a value of 1. In one or more examples, when the uplink beamforming is not requested to the station corresponding to the user information field 23 (e.g., station corresponding to the value of the 'AID12' sub-field), the trigger dependent user information sub-field 23_1 may include the 'beamformed' sub-field having a value of 0. In some embodiments, the trigger dependent user information sub-field 23_1 may further include at least one sub-field of having a parameter used for one or more additional purposes.

Referring to FIG. 8D, the trigger frame 31 may include a special user information field 32. For example, in the trigger frame 31, the special user information field 32 following the common information field may be defined. The special user information field 32 may include the 'AID12' sub-field and the 'beamformed' sub-field (or uplink beamforming-related second sub-field). The station receiving the trigger frame 31 may identify the special user information field 32 corresponding thereto by identifying the 'AID12' sub-field having a predefined value, and may identify whether the uplink beamforming is requested from the access point by identifying the 'beamformed' sub-field of the special user information field 32. In some embodiments, the special user information field 32 may further include at least one sub-field of another purpose.

Figure 9:
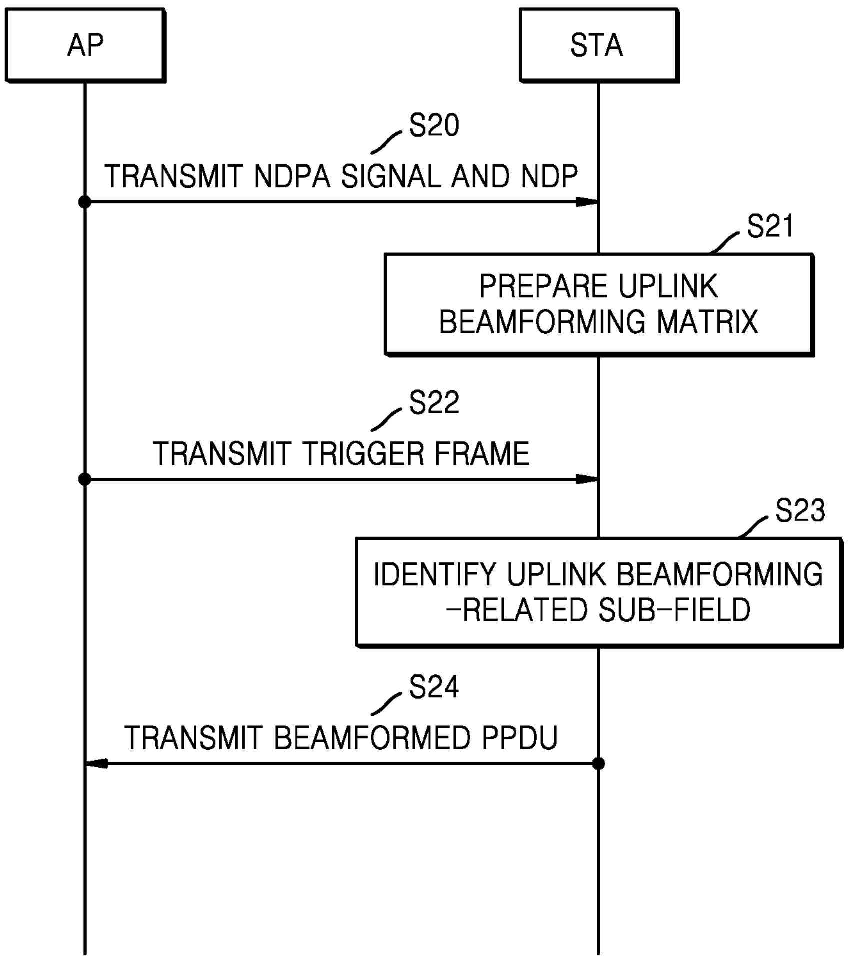
FIG. 9 is a flowchart illustrating a method of uplink beamforming according to one or more embodiments.

FIG. 9 is a flowchart illustrating a method of uplink beamforming according to one or more embodiments. In detail, the flowchart of FIG. 9 shows operations of the access point AP, for example, the beamformee, and the stations STA, for example, the beamformers, in the uplink beamforming.

Referring to FIG. 9, the access point AP may transmit an NDPA signal and an NDP to the station STA in operation S20. In one or more embodiments, the access point AP may transmit the NDP to the station STA when SIFS time has passed after transmitting the NDPA signal to the station STA.

In operation S21, the station STA may prepare the uplink beamforming matrix based on the NDP. In one or more embodiments, the station STA may estimate the downlink channel based on the NDP, and may determine the uplink beamforming matrix based on the estimated downlink channel to prepare the uplink beamforming matrix.

In operation S22, the access point AP may transmit the trigger frame to the station STA.

In operation S23, the station STA may identify the uplink beamforming-related sub-field included in the trigger frame. The uplink beamforming-related sub-field may match the second sub-field described above. In one or more embodiments, the station STA may identify a value of the sub-field included in the trigger frame.

In operation S24, the station STA may transmit the beamformed PPDU to the access point AP. In one or more embodiments, the station STA may generate the beamformed PPDU based on the uplink beamforming matrix prepared in operation S21, when the sub-field has a value indicating that the uplink beamforming has been requested.

Figure 10A:
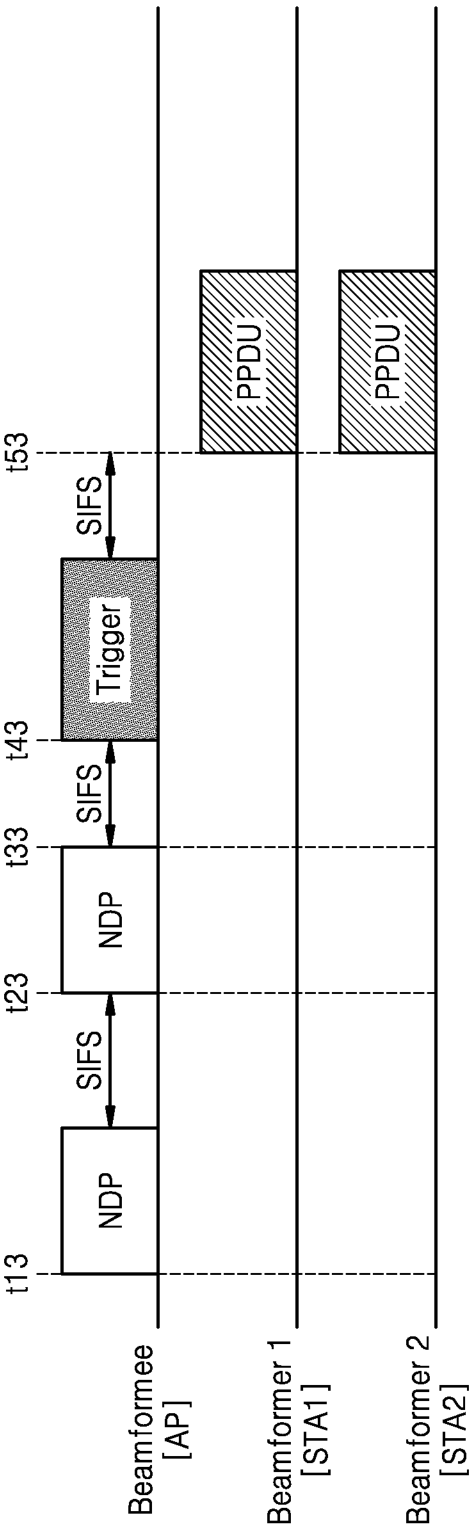
FIGS. 10A and 10B are timing diagrams showing a signaling for uplink beamforming according to one or more embodiments.
Figure 10B:
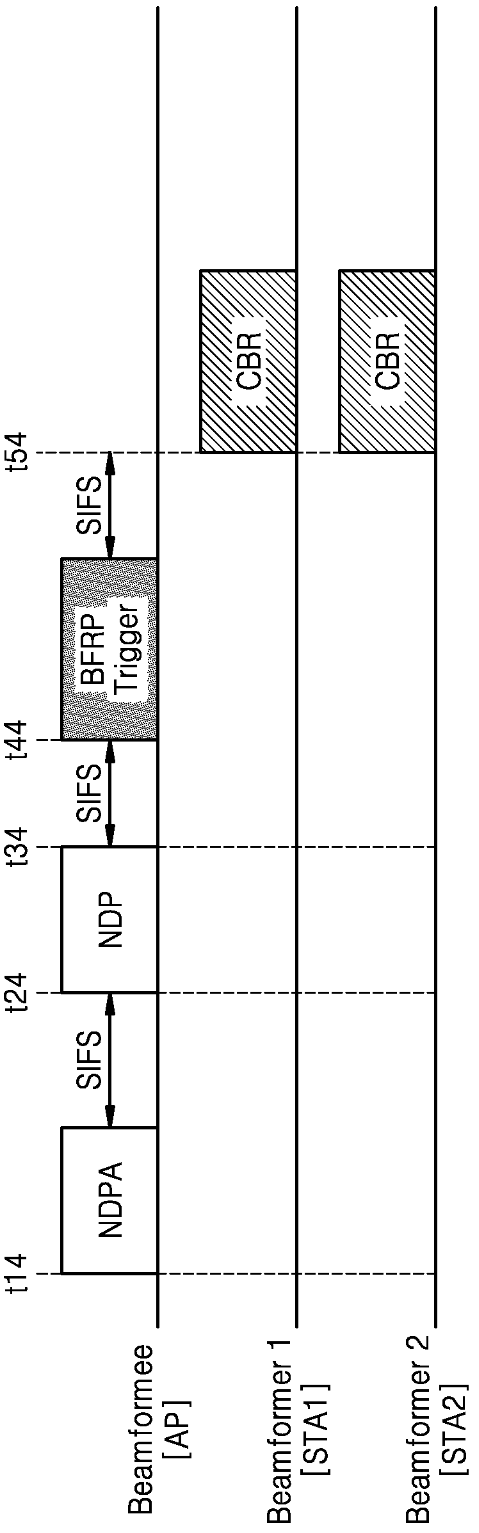

FIGS. 10A and 10B are timing diagrams showing a signaling for uplink beamforming according to one or more embodiments. In FIGS. 10A and 10B, the beamformee may be an access point AP, and the first and second beamformers may be first and second stations STA1 and STA2.

Referring to FIG. 10A, at a time t13, the beamformee may transmit an NPDA signal to the first and second beamformers.

At time t23, the beamformee may transmit the NDP to the first and second beamformers. In one or more embodiments, each of the first and second beamformers may prepare the uplink beamforming matrix based on the NDP. Each of the first and second beamformers may prepare the uplink beamforming matrix when receiving the NDP from the access point, which may be planned in advance with the access point.

At time t43, when the SIFS time has passed from time t33, the beamformee may transmit the trigger frame to the first and second beamformers.

At time t53, the first beamformer may generate the beamformed PPDU based on the prepared uplink beamforming matrix and transmit the beamformed PPDU to the beamformee, when it is identified that the uplink beamforming is requested based on the sub-field corresponding to the first beamformer. The second beamformer may generate the PPDU that is not beamformed and transmit the PPDU to the beamformee, when it is identified that the uplink beamforming is not requested based on the sub-field corresponding to the second beamformer. In some embodiments, the first and second beamformers may transmit the beamformed PPDU to the beamformee or transmit the PPDU that is not beamformed to the beamformee, according to the value of the sub-field that is in common in the first and second beamformers.

In one or more embodiments, the trigger frame of FIG. 10A may correspond to a basic trigger frame.

Referring to FIG. 10B, at time t14, the beamformee may transmit the NDPA signal to the first and second beamformers.

At time t24, the beamformee may transmit the NDP to the first and second beamformers. In one or more embodiments, each of the first and second beamformers may prepare the uplink beamforming matrix based on the NDP. For example, each of the first and second beamformers may prepare the uplink beamforming matrix when receiving the NDP from the access point, which may be planned in advance with the access point.

At time t44, when the SIFS time has passed from time t34, the beamformee may transmit a beamforming report poll (BFRP) trigger frame to the first and second beamformers. The BFRP trigger frame may include information that is necessary for the first and second beamformers to send feedback regarding the channel status information about the downlink channel to the beamformer. For example, the BFRP trigger frame may include information about resources that are used in uplink transmission.

At time t54, when identifying that the uplink beamforming is requested from the sub-field corresponding to the first beamformer, the first beamformer may generate a compressed beamforming report (CBR) frame that is beamformed based on the prepared uplink beamforming matrix and the BFRP trigger frame, and then, may transmit the beamformed CBR frame to the beamformee. When identifying that the uplink beamforming is not requested from the sub-field corresponding to the second beamformer, the second beamformer may generate the CBR frame that is not beamformed based on the BFRP trigger frame and then transmit the PPDU to the beamformee. In some embodiments, the first and second beamformers may transmit the beamformed CBR frame to the beamformee or transmit the CBR frame that is not beamformed to the beamformee, according to the value of the sub-field that is in common in the first and second beamformers.

Figure 11:
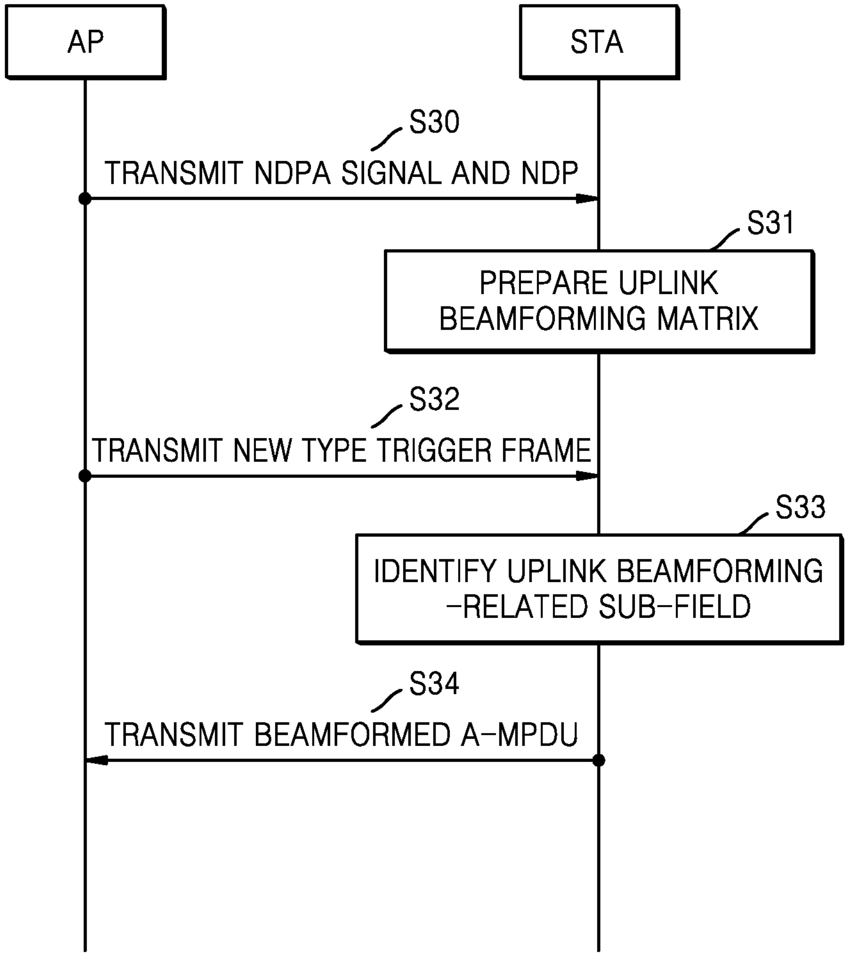
FIG. 11 is a flowchart illustrating a method of uplink beamforming according to one or more embodiments.

FIG. 11 is a flowchart illustrating a method of uplink beamforming according to one or more embodiments. In detail, the flowchart of FIG. 11 shows operations of the access point AP, that is, the beamformee, and the stations STA, that is, the beamformers, in the uplink beamforming.

Referring to FIG. 11, the access point AP may transmit an NDPA signal and an NDP to the station STA in operation S30. In one or more embodiments, the access point AP may transmit the NDP to the station STA when SIFS time has passed after transmitting the NDPA signal to the station STA.

In operation S31, the station STA may prepare the uplink beamforming matrix based on the NDP. In one or more embodiments, the station STA may estimate the downlink channel based on the NDP, and may determine the uplink beamforming matrix based on the estimated downlink channel to prepare the uplink beamforming matrix.

In operation S32, the access point AP may transmit a new type trigger frame to the station STA. In one or more embodiments, the new type trigger frame is newly defined via the trigger type sub-field included in the common information field of the trigger frame, and may be the trigger frame for requesting the station STA to perform the uplink beamforming and to transmit A-MPDU including the CBR frame and data. In some embodiments, the new type trigger frame may be defined to request the station STA to simultaneously trigger the CBR frame and the data. Detailed embodiment of the new type trigger frame will be described later with reference to FIGS. 13A and 13B.

In operation S33, the station STA may identify the uplink beamforming-related sub-field included in the new type trigger frame. The uplink beamforming-related sub-field may match the second sub-field described above. In one or more embodiments, the station STA may identify a value of the sub-field included in the new type trigger frame.

In operation S34, the station STA may transmit the beamformed A-MPDU to the access point AP. In one or more embodiments, the station STA identifies that the received trigger frame is the new type trigger frame through the trigger type sub-field, and when the sub-field has a value indicating that the uplink beamforming is requested, the station STA may generate the beamformed A-MPDU based on the uplink beamforming matrix prepared in operation S31.

However, the embodiment of requesting the station STA to transmit the A-MPDU by using the new type trigger frame is an example, and the embodiments are not limited thereto. That is, the access point AP may request the station STA to transmit the A-MPDU by using the reserved bits in one of the common information field, the special user information field, and the user information field of the basic trigger frame.

Figure 12:
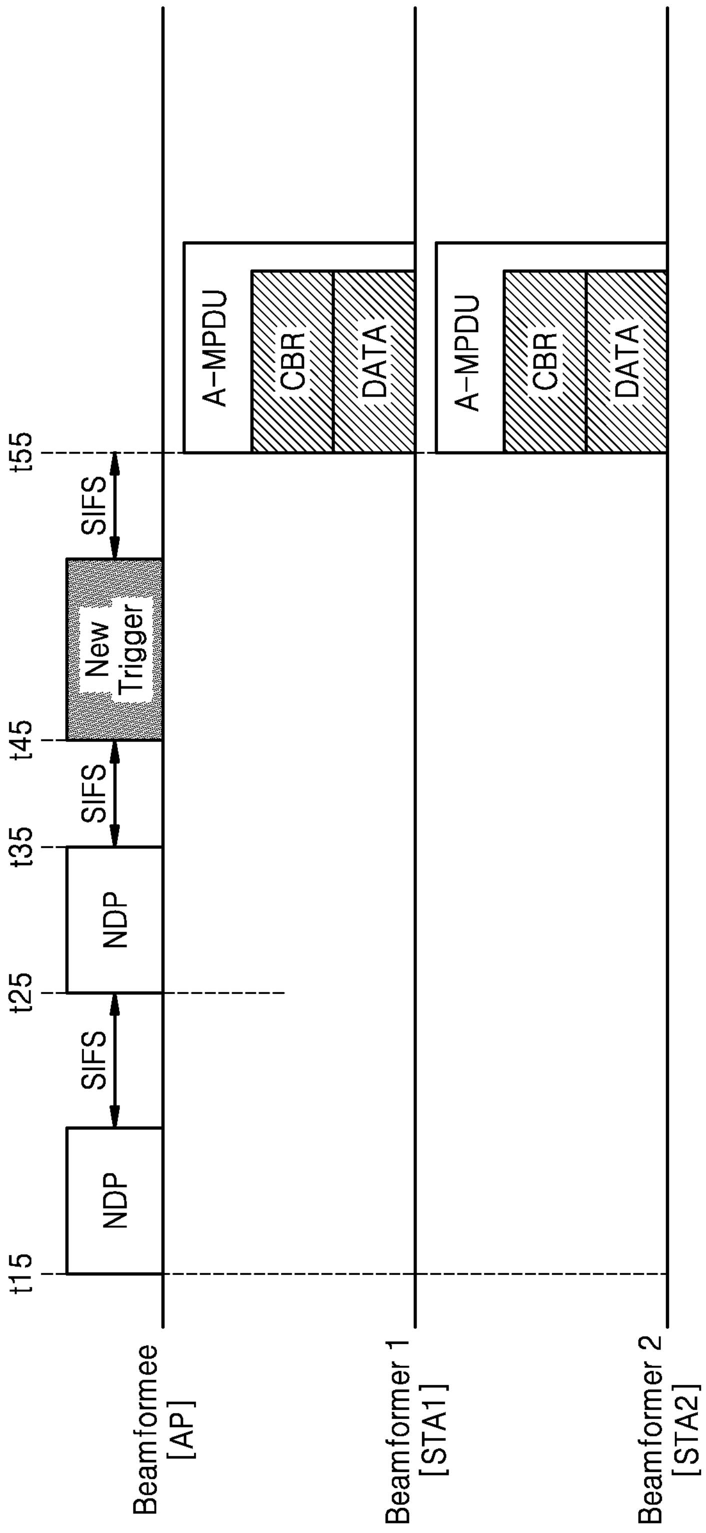
FIG. 12 is a timing diagram showing signaling for uplink beamforming according to one or more embodiments.

FIG. 12 is a timing diagram showing a signaling for uplink beamforming according to one or more embodiments. In FIG. 12, the beamformee is an access point AP, and the first and second beamformers are first and second stations STA1 and STA2.

Referring to FIG. 12, at a time t15, the beamformee may transmit an NPDA signal to the first and second beamformers.

At a time t25, the beamformee may transmit the NDP to the first and second beamformers. In one or more embodiments, each of the first and second beamformers may prepare the uplink beamforming matrix based on the NDP. Each of the first and second beamformers may prepare the uplink beamforming matrix when receiving the NDP from the access point, and this may be planned in advance with the access point.

At time t45 after the SIFS time from time t35, the beamformee may transmit the new type trigger frame to the first and second beamformers.

At time t55, when identifying that the received trigger frame is the new type trigger frame and the uplink beamforming is requested from the sub-field corresponding to the first beamformer, the first beamformer may generate the beamformed A-MPDU based on the prepared uplink beamforming matrix and transmit the beamformed A-MPDU to the beamformee. In one or more embodiments, the beamformed A-MPDU may include the CBR frame and the data. When identifying that the received trigger frame is the new type trigger frame and the uplink beamforming is not requested from the sub-field corresponding to the second beamformer, the second beamformer may generate the A-MPDU and transmit the A-MPDU to the beamformee. In some embodiments, the first and second beamformers may transmit the beamformed A-MPDU to the beamformee or transmit the A-MPDU that is not beamformed to the beamformee, according to the value of the sub-field that is in common in the first and second beamformers.

Figure 13B:
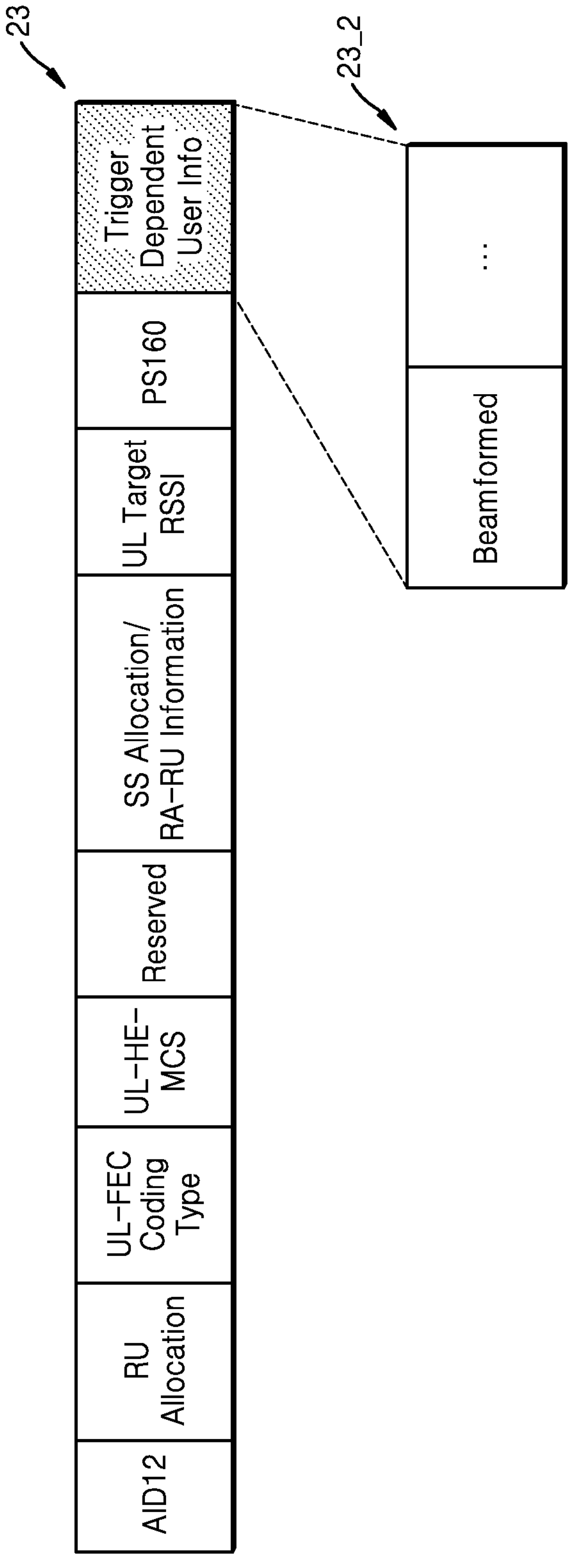
FIG. 13B is a diagram showing a sub-field of a new type trigger frame according to one or more embodiments.

FIG. 13A is a diagram showing encoding of a trigger-type sub-field according to one or more embodiments, and FIG. 13B is a diagram showing a sub-field 23_2 of a user information field 23 of anew type trigger frame. In detail, FIG. 13A shows a table TB2 defining encoding of the trigger type sub-field included in the common information field.

Referring to the table TB2 of FIG. 13A, the trigger type sub-field may have one of the values 0 to 8 corresponding to basic, BFRP, BR-BAR, MU-RTS, BSRP, GCR MU-BAR, BQRP, NFRP, and New Trigger Variant, respectively. The new type trigger frame of FIG. 12 may have a value 8 corresponding to the New Trigger Variant. Accordingly, the station may identify that the received trigger frame is the new type trigger frame by identifying that the value of the trigger type sub-field of the trigger frame is 8. In addition, values 9 to 15 may remain as reserved.

Referring to FIG. 13B, the new type trigger frame may include the user information field 23 including the trigger dependent user sub-field 23_2. In one or more embodiments, the trigger dependent user information sub-field 23_2 may include 'beamformed' sub-field (or uplink beamforming-related sub-field). For example, in order to request the uplink beamforming from a station corresponding to the user information field 23 (e.g., station corresponding to a value of the 'AID12' sub-field), a trigger dependent common information sub-field 22_2 may include the 'beamformed' sub-field having a value of 1. In one or more examples, the uplink beamforming is not requested to the station corresponding to the user information field 23 (e.g., station corresponding to the value of the 'AID12' sub-field), the trigger dependent common information sub-field 22_2 may include the 'beamformed' sub-field having a value of 0. In some embodiments, the trigger dependent user sub-field 23_2 may further include at least one sub-field of another purpose.

Figure 14:
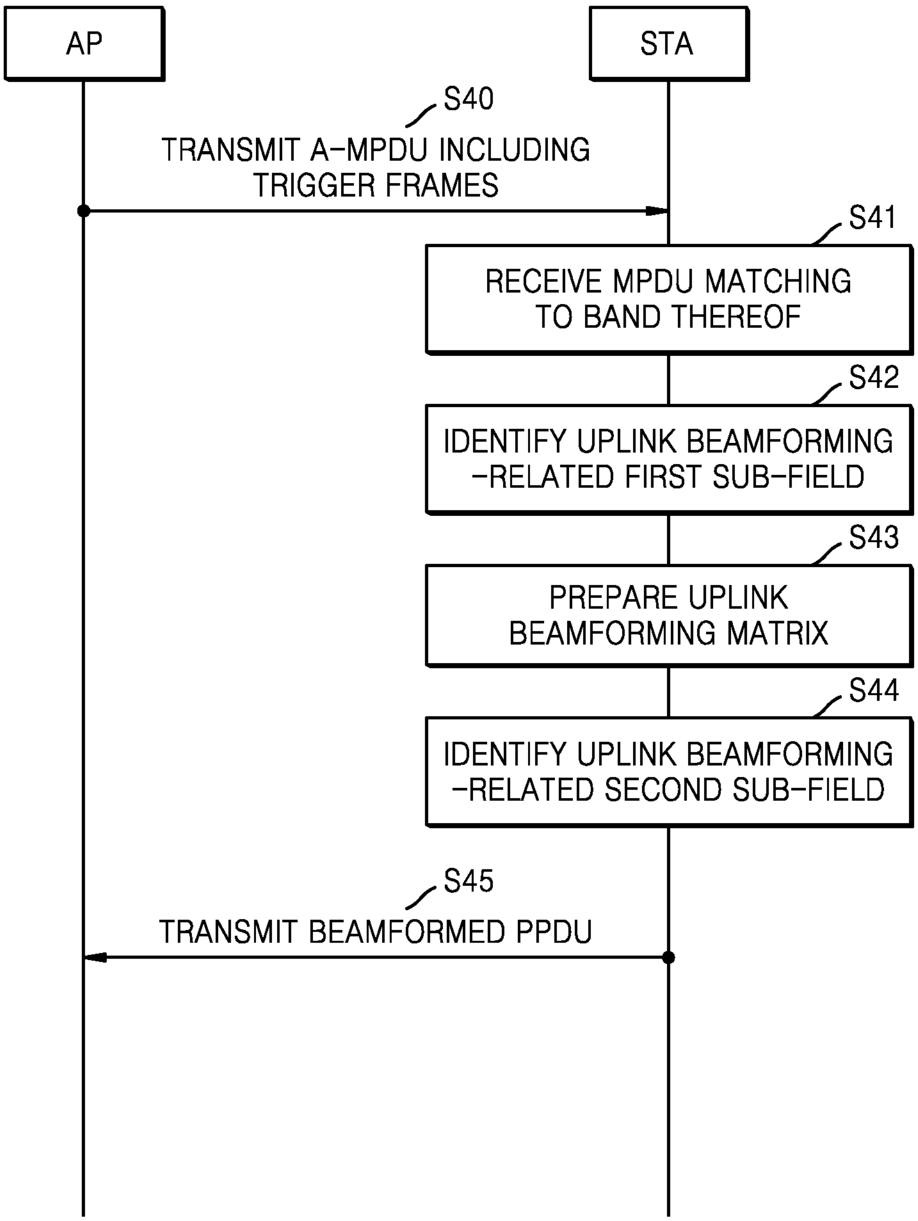
FIG. 14 is a flowchart illustrating a method of uplink beamforming according to one or more embodiments.

FIG. 14 is a flowchart illustrating a method of uplink beamforming according to one or more embodiments. In detail, the flowchart of FIG. 14 shows operations of the access point AP, that is, the beamformee, and the stations STA, that is, the beamformers, in the uplink beamforming.

Referring to FIG. 14, in operation S40, the access point AP may transmit the A-MPDU including the trigger frames to the station STA. In one or more embodiments, the access point AP may process PPDUs respectively including the trigger frames corresponding to different bands in the form of A-MPDU and transmit the A-MPDU to the station STA. For example, the trigger frames may include a first trigger frame corresponding to an upper end a 80 MHz band and a second trigger frame corresponding to lower end of 80 MHz band.

In operation S41, the station STA may receive the MPDU matching the 80 MHz band thereof. For example, the upper end of the 80 MHz band may be allocated to the station STA for communication with the access point AP, and at this time, the station STA may receive the MPDU corresponding to the upper end of the 80 MHz band. In addition, the MPDU corresponding to the lower end of 80 MHz band may be received by another station STA.

In operation S42, the station STA may identify the uplink beamforming related first sub-field from the received MPDU. For example, the station STA may identify the value of the first sub-field included in the preamble of the received MPDU. The first sub-field may be a sub-field that is defined to indicate whether the station STA has to prepare the uplink beamforming matrix.

In operation S43, the station STA may prepare the uplink beamforming matrix. In one or more embodiments, the station STA may prepare the uplink beamforming matrix based on the trigger frame of the received MPDU when the station STA has a value indicating that the station STA has to prepare the uplink beamforming matrix.

In operation S44, the station STA may identify a second sub-field related to the uplink beamforming. In one or more embodiments, the station STA may identify the uplink beamforming related second sub-field from the trigger frame of the received MPDU. In one or more embodiments, the station STA may identify a value of the second sub-field included in the trigger frame. The second sub-field may be a sub-field that is defined or reserved to indicate whether the access point AP requests the uplink beamforming (or beamformed PPDU) from the station STA. For example, if this sub-field includes a value set to 1, it may be determined that uplink beamforming is requested.

In operation S45, the station STA may transmit the beamformed PPDU to the access point AP. In one or more embodiments, the station STA may generate the beamformed PPDU based on the uplink beamforming matrix prepared in operation S43, when the second sub-field has a value indicating that the uplink beamforming has been requested. In one or more examples, the station STA may beamform the PPDU based on the uplink beamforming matrix.

Figure 15:
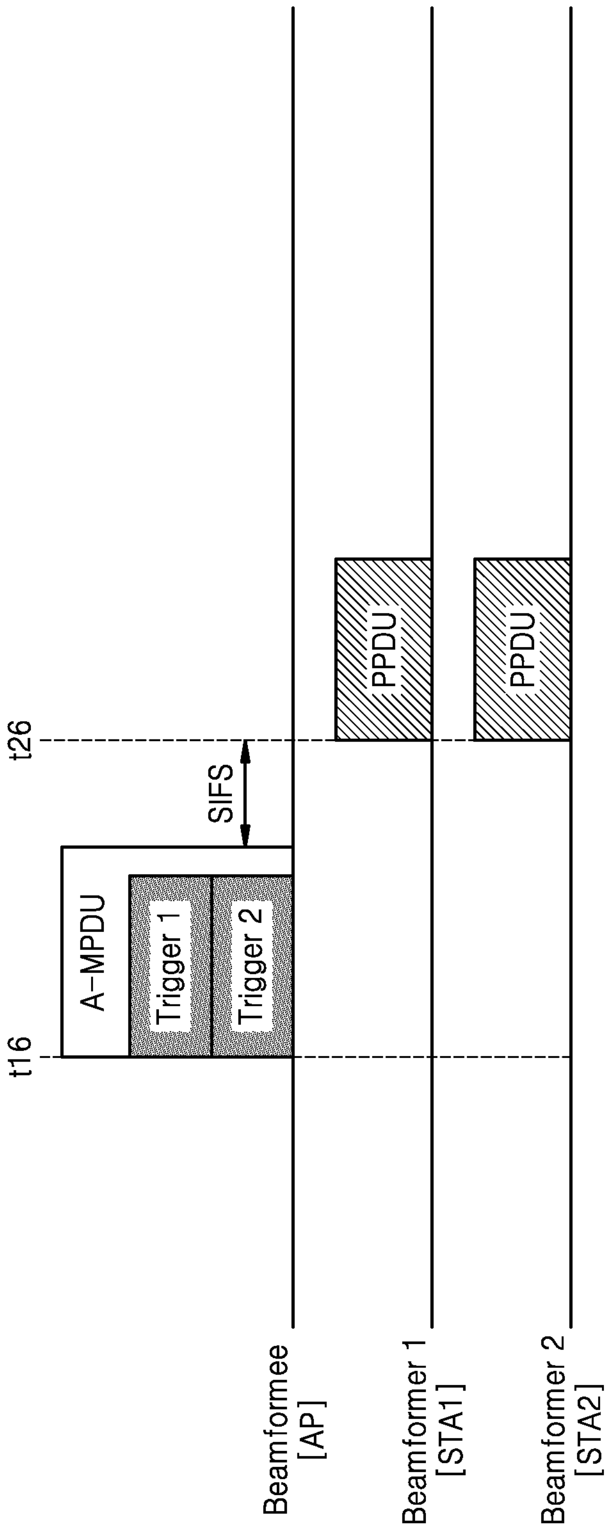
FIG. 15 is a timing diagram showing signaling for uplink beamforming according to one or more embodiments.

FIG. 15 is a timing diagram showing a signaling for uplink beamforming according to one or more embodiments. In detail, in FIG. 15, the beamformee may be an access point AP, and the first and second beamformers are first and second stations STA1 and STA2.

Referring to FIG. 15, at time t16, the beamformee may transmit the A-MPDU including the first trigger frame and the second trigger frame to the first and second beamformers. In detail, the beamformee may arrange the first trigger frame in some of the payload of the first MPDU corresponding to the first band, and may arrange the second trigger frame in some of the payload of the second MPDU corresponding to the second band to generate the A-MPDU. For example, the beamformee may allocate the first band for communicating with the first beamformer and may allocate the second band for communicating with the second beamformer. In one or more examples, the beamformee may notify the first beamformer whether the uplink beamforming matrix has to be prepared in advance by using the first sub-field included in the preamble of the first MPDU, and may notify the second beamformer whether the uplink beamforming matrix has to be prepared in advance by using the first sub-field included in the preamble of the second MPDU. In one or more embodiments, the first and second bands may match to a frequency band greater than or equal to 80 MHz.

At time t26, the first beamformer estimates a downlink channel in the first band by decoding the first trigger frame and then may determine the uplink beamforming matrix based on the estimated downlink channel, when it is identified that the uplink beamforming matrix has to be prepared based on the first sub-field of the first MPDU. The first beamformer may generate the beamformed PPDU based on the prepared uplink beamforming matrix and transmit the beamformed PPDU to the beamformee via the first band, when it is identified that the uplink beamforming is requested based on the second sub-field corresponding to the first beamformer of the first trigger frame. The second beamformer estimates a downlink channel in the second band by decoding the second trigger frame and then may determine the uplink beamforming matrix based on the estimated downlink channel, when it is identified that the uplink beamforming matrix has to be prepared based on the first sub-field of the second MPDU. The second beamformer may generate the beamformed PPDU based on the prepared uplink beamforming matrix and transmit the beamformed PPDU to the beamformee via the second band, when it is identified that the uplink beamforming is requested based on the second sub-field corresponding to the second beamformer of the second trigger frame.

As described above, the beamformee may individually direct the operations of preparing the uplink beamforming matrix in each of the first and second beamformers, by using the first sub-field of the first MPDU and the first sub-field of the second MPDU.

Figure 16A:
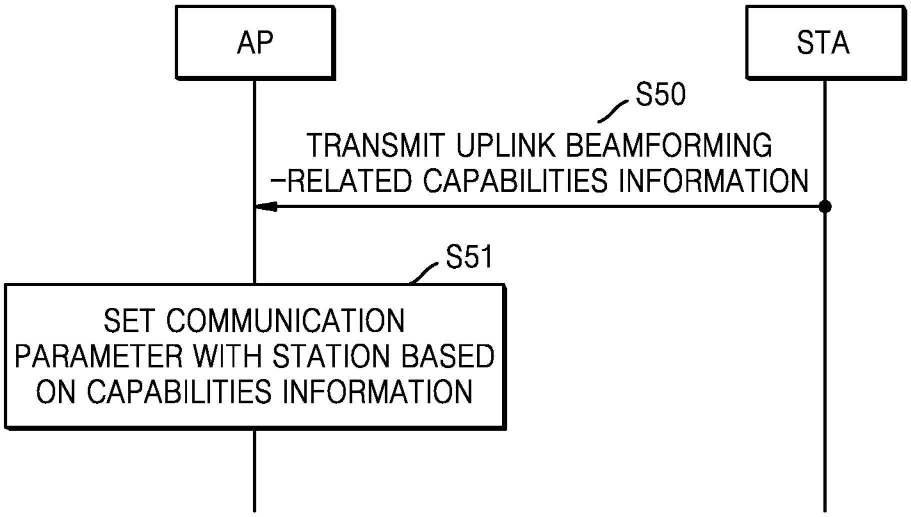
FIG. 16A is a flowchart illustrating a method of uplink beamforming according to one or more embodiments.

FIG. 16A is a flowchart illustrating a method of uplink beamforming according to one or more embodiments, and FIG. 16B is a diagram for describing uplink beamforming-related capability information. In detail, the flowchart of FIG. 16A shows operations of the access point AP, for example, the beamformee, and the stations STA, for example, the beamformers, in the uplink beamforming. A table TB3 of FIG. 16B shows sub-fields of an 'EHT PHY Capabilities Information' field indicating whether the uplink beamforming may be supported according to the embodiments.

Referring to FIG. 16A, in operation S50, the station STA may transmit uplink beamforming related capability information to the access point AP. In one or more embodiments, the uplink beamforming-related capability information may indicate whether the station STA is capable of supporting the uplink beamforming according to the embodiments. In detail, the uplink beamforming-related capability information may indicate whether to support the above-mentioned uplink beamforming through minimum signaling, the operation of preparing the uplink beamforming matrix, etc.

In operation S51, the access point AP may set a communication parameter with the station STA based on the received capability information. In one or more embodiments, the access point AP may set the value of the first sub-field or the second sub-field according to the uplink beamforming-related capability of the station STA.

Referring to FIG. 16B, the 'EHT PHY Capabilities Information' field defined in the standard protocol of IEEE 802.11be may include a sub-field indicating whether to support the uplink beamforming in the station. For example, when the beamforming may support the uplink beamforming, the value of the corresponding sub-field may be set to be 1. For example, when the beamforming may not support the uplink beamforming, the value of the corresponding sub-field may be set to be 1.

Figure 17:
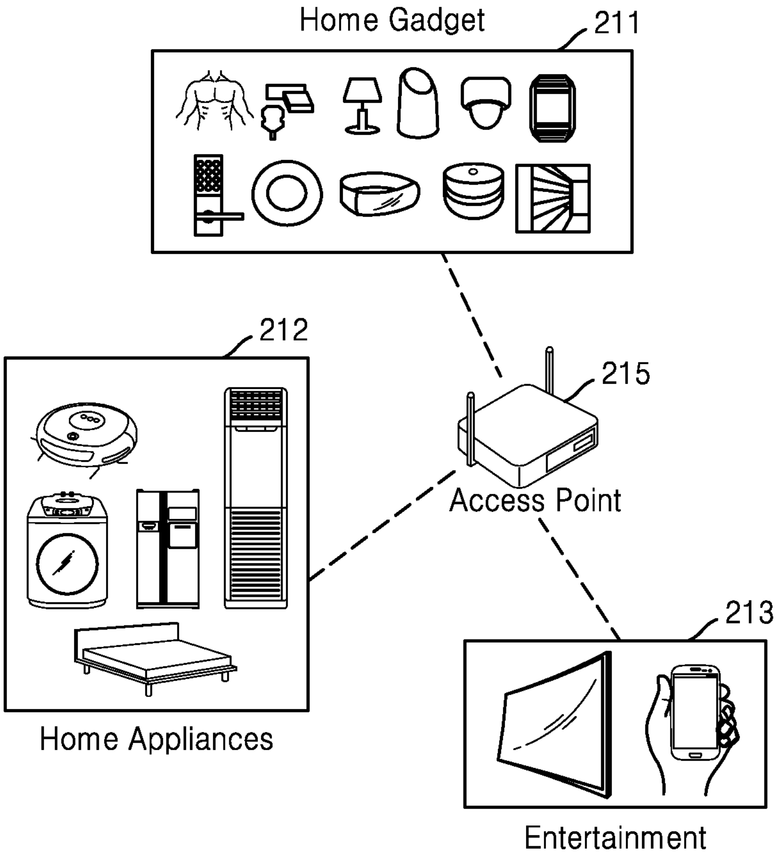
FIG. 17 is a diagram showing examples of a device for wireless communication according to one or more embodiments.

FIG. 17 is a diagram showing examples of a device for wireless communication according to one or more embodiments. In detail, FIG. 17 shows an Internet of things (IoT) network system including home gadgets 211, home appliances 212, entertainment devices 213, and an access point 215.

In some embodiments, a transmission device for wireless communication in FIG. 17 may perform the minimum signaling with a receiving device for the uplink beamforming, as described above with reference to the drawings. In one or more examples, the receiving device may prepare the uplink beamforming matrix in advance based on certain sub-fields and perform the uplink beamforming, and thus, a total communication throughput may be improved as described above with reference to the drawings.

Figure 18:
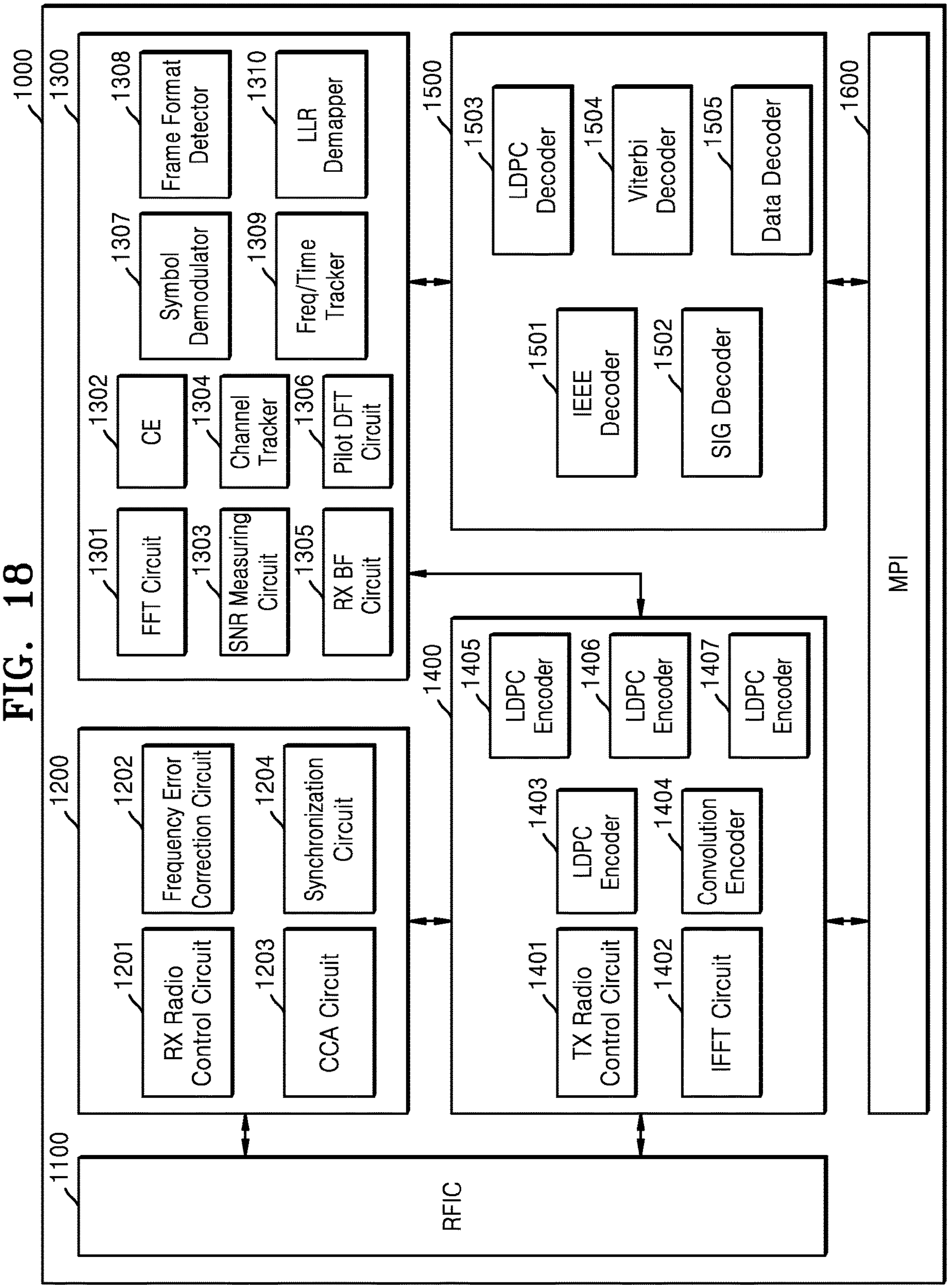
FIG. 18 is a diagram showing a detailed example of a device according to one or more embodiments.

FIG. 18 is a block diagram of an apparatus 1000 according to one or more embodiments. The apparatus 1000 may be the station or the access point described above.

Referring to FIG. 18, the apparatus 1000 may include a radio frequency integrated circuit (RFIC) 1100, a receiving circuit 1200, a demodulator 1300, a transmission circuit 1400, a processor 1500, and a MAC-PHY interface (MPI) 1600. In FIG. 18, the elements 1100, 1200, 1300, 1400, 1500, and 1600 are separated, but the embodiments are not limited thereto. For example, some or all of the elements 1100, 1200, 1300, 1400, 1500, and 1600 may be implemented to be included in one chip (e.g., a modem chip).

The receiving circuit 1200 may include an RX radio control circuit 1201, a frequency error correction circuit 1202, a clear-channel-assessment (CCA) circuit 1203, and a synchronization circuit 1204.

The demodulator 1300 may include a fast Fourier transform (FFT) circuit 1301, a channel estimator (CE) 1302, a signal to noise ratio (SNR) measuring circuit 1303, a channel tracker 1304, a reception beamforming (RX BF) circuit 1305, a pilot discrete Fourier transform (DFT) circuit 1306, a symbol demodulator 1307, a frame format detector 1308, a frequency/time tracker 1309, and a long-likelihood ratio (LLR) demapper 1310.

The transmission circuit 1400 may include a transmission (TX) radio control circuit 1401, an inverse fast Fourier transform (IFFT) circuit 1402, a low-density parity-check (LDPC) encoder 1403, a convolution encoder 1404, a TX BF circuit 1405, a data encoder 1406, and a preamble circuit 1407.

The processor 1500 may include an IEEE decoder 1501, a signal (SIG) decoder 1502, an LDPC decoder 1503, a Viterbi decoder 1504, and a data decoder 1505.

In one or more embodiments, the RFIC 1100 may receive the PPDU provided with the payload including the trigger frame through at least one antenna, and the RX BF circuit 1305 may prepare the uplink beamforming matrix based on the value of the uplink beamforming-related first sub-field included in the preamble of the PPDU. The transmission circuit 1400 may generate the beamformed PPDU that matches to the uplink beamforming matrix generated by the RX BF circuit 1305 based on the uplink beamforming-related second sub-field included in the trigger frame. In some embodiments, the transmission circuit 1400 may use at least one of the internal elements 1401, 1402, 1403, 1404, 1405, 1406, and 1407 in order to generate the beamformed PPDU.

In one or more embodiments, the RFIC 1100 may receive the NDPA signal and the NDP via the at least one antenna, and the RX BF circuit 1305 may prepare the uplink beamforming matrix based on the NDP. In one or more examples, the RFIC 1100 may receive the trigger frame including the uplink beamforming-related sub-field, and the transmission circuit 1400 may generate the beamformed PPDU matching to the uplink beamforming matrix generated by the RX BF circuit 1305 based on the value of the sub-field in the trigger frame.

In one or more embodiments, the RFIC 1100 may receive the A-MPDU including the first trigger frame corresponding to the first band through at least one antenna, and the RX BF circuit 1305 may prepare the uplink beamforming matrix based on the value of the uplink beamforming-related first sub-field included in the preamble corresponding to the first band in the A-MPDU. The transmission circuit 1400 may generate the beamformed PPDU that matches to the uplink beamforming matrix generated by the RX BF circuit 1305 based on the value of the uplink beamforming-related second sub-field included in the first trigger frame.

The transmission circuit 1400 may output the beamformed PPDU to the RFIC 1100 based on the above embodiments, and the RFIC 1100 may transmit the beamformed PPDU to another device through at least one antenna.

While the embodiments have been particularly shown and described with reference to embodiments thereof, it will be understood that various changes in form and details may be made therein without departing from the spirit and scope of the following claims.

What is claimed is:

1. An operating method of a first device communicating with a second device in a wireless local area network (WLAN), the operating method comprising:

receiving, from the second device, a physical layer protocol data unit (PPDU) comprising a payload that comprises a trigger frame;

preparing an uplink beamforming matrix based on a value of an uplink beamforming-related first sub-field included in a preamble of the PPDU;

beamforming, according to the uplink beamforming matrix, a PPDU; and transmitting the beamformed PPDU to the second device based on a value of an uplink beamforming-related second sub-field included in the trigger frame, wherein the uplink beamforming-related first sub-field is defined to indicate whether the first device has to prepare the uplink beamforming matrix, and wherein the uplink beamforming-related second sub-field is defined to indicate whether the second device requests the uplink beamforming from the first device.

2. The operating method of claim 1, wherein the uplink beamforming-related first sub-field is provided in an extremely high throughput-signal (EHT-SIG) field of the preamble.

3. The operating method of claim 1, wherein the uplink beamforming-related first sub-field is provided in a universal-signal (U-SIG) field in the preamble.

4. The operating method of claim 1, wherein the uplink beamforming-related second sub-field is provided in a common information field of the trigger frame.

5. The operating method of claim 1, wherein the uplink beamforming-related second sub-field is provided in a user information field of the trigger frame.

6. The operating method of claim 1, wherein the uplink beamforming-related second sub-field is provided in a special user information field of the trigger frame.

7. The operating method of claim 1, wherein the value of the uplink beamforming-related first sub-field is commonly applied to both the first device and a third device in the WLAN, the second device communicating with the third device, and the value of the uplink beamforming-related second sub-field is individually applied to the first device and not applied to the third device.

8. The operating method of claim 1, wherein the preparing of the uplink beamforming matrix comprises:

estimating a downlink channel based on the trigger frame; and determining the uplink beamforming matrix based on the estimated downlink channel.

9. The operating method of claim 1, further comprising transmitting uplink beamforming-related capacity information to the second device.

10. An operating method of a first device communicating with a second device in a wireless local area network (WLAN), the operating method comprising:

receiving, from the second device, a null data packet announcement (NDPA) signal and a null data packet (NDP);

preparing an uplink beamforming matrix based on the NDP;

receiving a trigger frame including an uplink beamforming-related sub-field from the second device;

beamforming an uplink signal according to the uplink beamforming matrix based on a value of the uplink beamforming-related sub-field; and transmitting the beamformed uplink signal to the second device, wherein the uplink beamforming-related sub-field is defined to indicate whether the second device requests uplink beamforming from the first device.

11. The operating method of claim 10, wherein the trigger frame comprises a basic trigger frame, and the uplink signal that is beamformed is a beamformed physical layer protocol data unit (PPDU).

12. The operating method of claim 10, wherein the trigger frame comprises a beamforming report poll (BFRP) trigger frame, and the uplink signal that is beamformed comprises a beamformed compressed beamforming report (CBR) frame.

13. The operating method of claim 10, wherein the trigger frame comprises a new type trigger frame, and the uplink signal that is beamformed comprises a beamformed aggregated-media access control (MAC) protocol data unit (A-MPDU).

14. The operating method of claim 13, wherein the beamformed A-MPDU comprises a physical layer protocol data unit (PPDU) comprising data and corresponding to a first band and a compressed beamforming report (CBR) frame corresponding to a second band.

15. The operating method of claim 13, wherein the uplink beamforming-related sub-field is arranged in a trigger dependent user information sub-field of a user information field of the trigger frame.

16. The operating method of claim 10, wherein the preparing the uplink beamforming matrix comprises:

estimating a downlink channel by decoding the NDP; and determining the uplink beamforming matrix based on the estimated downlink channel.

17. The operating method of claim 10, further comprising transmitting uplink beamforming-related capacity information using the NDP and the trigger frame to the second device.

18. An operating method of a first device communicating with a second device in a wireless local area network (WLAN), the operating method comprising:

receiving, from the second device, an aggregated-media access control (MAC) protocol data unit (A-MPDU) comprising a first trigger frame corresponding to a first band;

preparing an uplink beamforming matrix based on a value of an uplink beamforming-related first sub-field included in a preamble corresponding to the first band of the A-MPDU;

beamforming, according to the uplink beamforming matrix, an A-MPDU; and transmitting the beamformed A-MPDU to the second device based on a value of an uplink beamforming-related second sub-field included in the first trigger frame, wherein the uplink beamforming-related first sub-field is defined to indicate whether the first device has to prepare the uplink beamforming matrix, and wherein the uplink beamforming-related second sub-field is defined to indicate whether the second device requests the uplink beamforming from the first device.

19. The operating method of claim 18, wherein the A-MPDU received from the second device further comprises a second trigger frame corresponding to a second band and transmitted to a third device in the WLAN, the third device communicating with the second device.

20. The operating method of claim 19, wherein the first band and the second band match to a frequency greater than or equal to 80 MHz.

* * * * *